(12) United States Patent
Skuratowicz et al.

(10) Patent No.: US 11,716,297 B2
(45) Date of Patent: Aug. 1, 2023

(54) METHODS AND SYSTEMS FOR INDICATING LOCATION STATUS AND AVAILABILITY STATUS WITHIN A COMMUNICATION INTERFACE

(71) Applicant: Verizon Patent and Licensing Inc., Basking Ridge, NJ (US)

(72) Inventors: David Skuratowicz, Felton, CA (US); Alagu Periyannan, Palo Alto, CA (US); Mohammad Raheel Khalid, Budd Lake, NJ (US); Selina Hu, Seattle, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 17/219,566

(22) Filed: Mar. 31, 2021

(65) Prior Publication Data
US 2022/0321507 A1 Oct. 6, 2022

(51) Int. Cl.
*G06Q 10/10* (2023.01)
*G06F 3/04817* (2022.01)
*H04L 51/043* (2022.01)

(52) U.S. Cl.
CPC ........ *H04L 51/043* (2013.01); *G06F 3/04817* (2013.01); *G06Q 10/10* (2013.01)

(58) Field of Classification Search
CPC .... H04L 51/043; G06F 3/04817; G06Q 10/10
See application file for complete search history.

(56) References Cited

U.S. PATENT DOCUMENTS

| | | | |
|---|---|---|---|
| 2009/0170480 A1* | 7/2009 | Lee | H04M 1/72448 455/566 |
| 2012/0150789 A1* | 6/2012 | Jhoney | G06Q 10/06311 706/46 |
| 2016/0163070 A1* | 6/2016 | Leacock | G06T 11/00 715/758 |
| 2016/0196596 A1* | 7/2016 | Van Wie | H04N 7/157 705/26.41 |
| 2017/0075737 A1* | 3/2017 | Kim | G06F 3/0488 |
| 2017/0331770 A1* | 11/2017 | Griffin | H04L 65/403 |
| 2020/0351224 A1* | 11/2020 | Gale | H04L 51/20 |

* cited by examiner

*Primary Examiner* — Tan H Tran

(57) ABSTRACT

An illustrative communication provider system presents, to a first user, a communication interface that displays a representation of a shared virtual space that the first user shares with a second user. The communication provider system determines a virtual location status and an availability status for the second user. The virtual location status is representative of a virtual location of the second user within the shared virtual space. The availability status is representative of a particular availability mode included in a plurality of selectable availability modes. The communication provider system displays, within the communication interface presented to the first user, a profile icon for the second user. The profile icon indicates both the virtual location status and the availability status of the second user to the first user. Corresponding methods and systems are also disclosed.

20 Claims, 12 Drawing Sheets

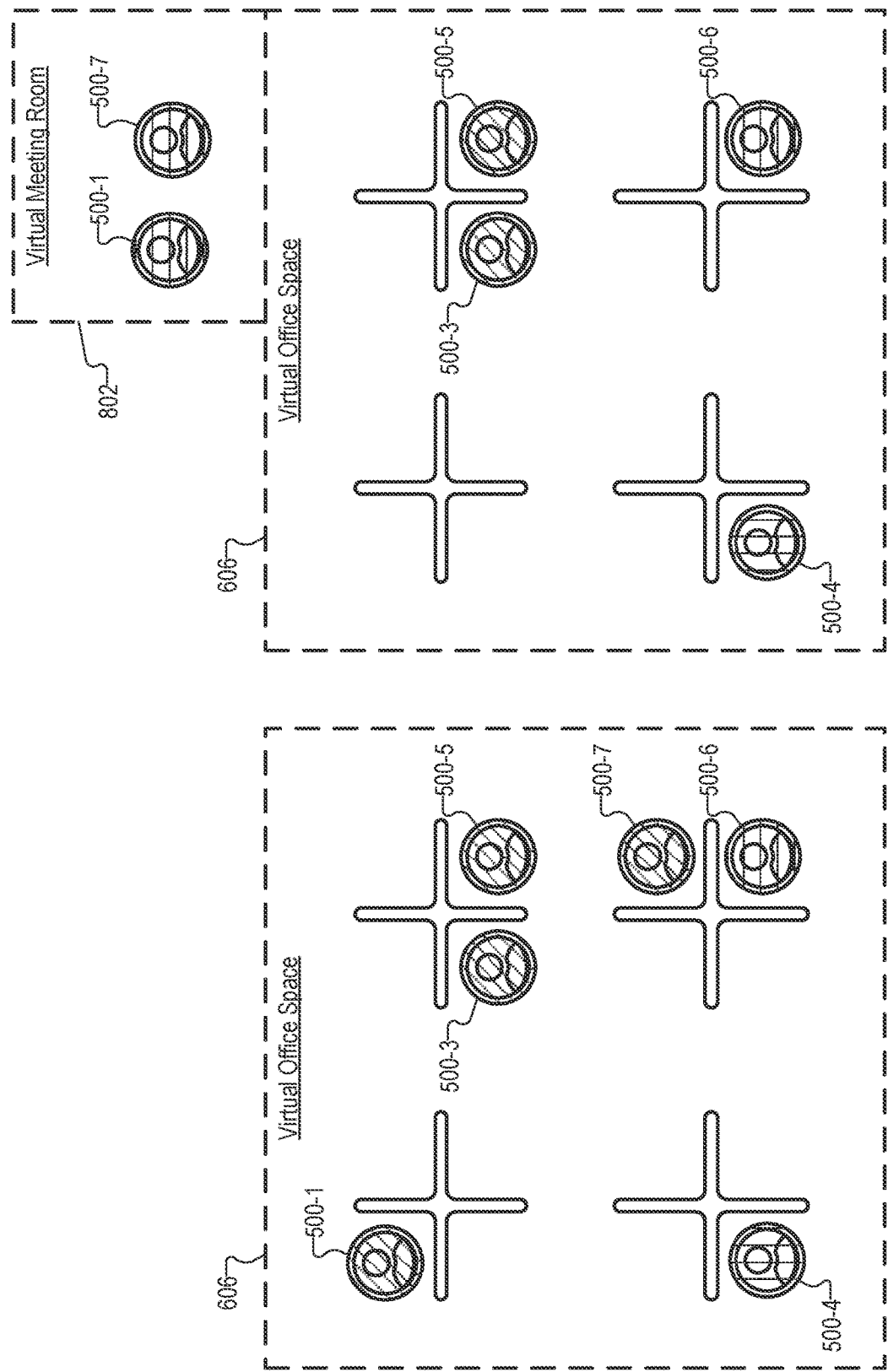

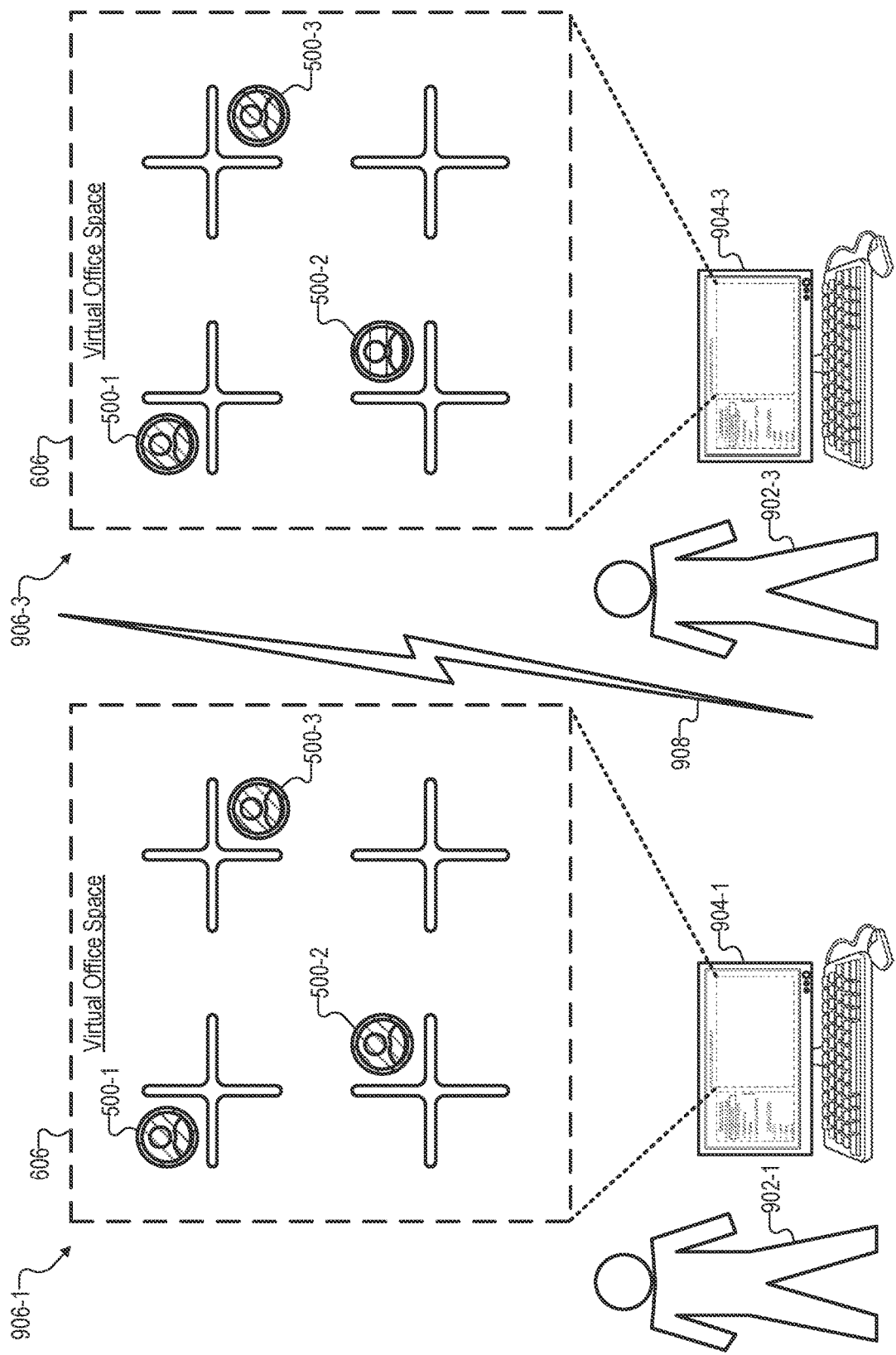

METHODS AND SYSTEMS FOR INDICATING LOCATION STATUS AND AVAILABILITY STATUS WITHIN A COMMUNICATION INTERFACE

BACKGROUND INFORMATION

The combination of various conditions and events in recent years has created a demand for ever more effective, convenient, and flexible ways of facilitating communication between people who are located remotely from one another. As one example, a global pandemic and other factors have driven a dramatic increase in the number of people who perform some or all their work from home or other convenient locations rather than from a physical office space or other shared physical space.

Many positive consequences have attended these increases in remote communication and telecommuting. For example, office workers may, in many ways, be more comfortable working from home than in an office, and may use time previously reserved for commuting as additional work time or free time, thereby increasing their efficiency and/or sense of morale and work-life balance. Unfortunately, along with these gains in efficiency and morale that have resulted from remote working trends, certain communication challenges have also presented themselves. For example, people communicating remotely using conventional technologies (e.g., phone calls, video conferencing, etc.) may lose various subtle aspects of sharing and communicating within a common physical space, including a sense of spatial continuity between coworkers, nuanced social cues regarding whether other people are available to talk, and so forth.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIGS. 7A-8B show illustrative aspects of how profile icons depicted within the virtual office space of FIG. 6B may indicate different types of statuses for different users within a communication interface in accordance with principles described herein.

FIG. 9 shows illustrative differences in how a status of one user may be indicated within communication interfaces presented to other users in accordance with principles described herein.

DETAILED DESCRIPTION OF EXAMPLE EMBODIMENTS

Figure 1:
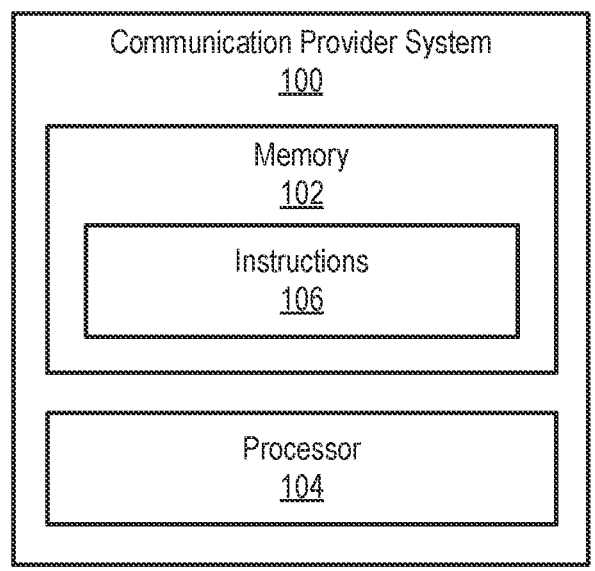
FIG. 1 shows an illustrative communication provider system configured to indicate location status and availability status within a communication interface in accordance with principles described herein.

Methods and systems for indicating location status and availability status within a communication interface are described herein. As mentioned above, certain challenges have presented themselves alongside the various advantages of increased remote communication trends. For instance, when coworkers are unable to work together in person, certain social and/or psychological aspects of being able to communicate in person with people in one's immediate vicinity may be compromised or lost.

One example of such a communicative aspect is the sense of community, social coherence, and/or spatial continuity that comes with occupying a particular location within a physical space in relation to locations occupied by other individuals. For example, when the workstations of team members who are working together on a joint project are all in close proximity, a sense of community and team camaraderie may develop that translates into high effectiveness, creativity, collaboration, teamwork, morale, and other positive outcomes for the team. Conversely, a team member that is seated apart from his or her team (e.g., in a different room, across the floor, etc.) may struggle to feel connected to his or her team members, which may result in less positive outcomes.

As another example of a communicative aspect that naturally accompanies shared physical spaces but that is typically lost or compromised for conventional remote communication, subtle social cues may be relied on to determine, for instance, when a person is available for a conversation, when the person may be focused and not wanting to be disturbed, when a person is completely unavailable (e.g., on a phone call, not at his or her workspace, etc.), and so forth. For example, when a first person is eating lunch at his or her desk and reading a news website, a second person who wishes to ask a question or make friendly small talk may infer that it would be an appropriate time to strike up a conversation. Conversely, when the first person finishes lunch, puts on noise-canceling headphones, and begins actively engaging with a work-related task (e.g., writing a document in a law firm setting, developing code in a software development setting, etc.), the second person may infer that it would be best to save the question or casual conversation for another time when the first person is not so focused.

To address these and other such aspects of communication that do not naturally accompany remote communication in the same way they accompany in-person communication, systems and methods described herein may be configured to indicate, within a communication interface (e.g., a remote communication portal), various types of status for each user. In this way, social cues and/or other aspects that may otherwise be missing from the remote communication may be not only replaced but also improved, such as by being more explicit, more customizable, and so forth.

A profile icon or other representation (e.g., avatar, etc.) of a user may be displayed to indicate various types of status for the user. The profile icon may indicate, for instance, a location status (e.g., where the user is virtually located within the shared virtual space), an availability status (e.g., whether the user is available for different types of communication or would prefer to not be disturbed), an activity status (e.g., whether the user is actively speaking, actively engaged on a work-related task, taking a break, present at or away from his or her physical desk, etc.), and/or any other type of status for the user as may serve a particular implementation. As will be illustrated and described in more detail below, various types of status may all be integrated into a single profile icon in a manner that conveniently shows, at a glance, various types of information that may not otherwise be easily discernible outside of an in-person setting.

In many respects, methods and systems described herein may not only provide adequate substitutions for aspects of in-person communication such as described above, but may provide superior solutions (e.g., more effective solutions, more customizable solutions, etc.) to longstanding drawbacks of in-person communication. For example, while a person in a physical office space may close a door or put on headphones or earplugs to try to block out ambient sounds in the space (e.g., conversations happening nearby, etc.), a person working in a virtual office space described herein may enjoy full control to fully mute and/or unmute such ambient sounds, to listen to them at whatever volume is desired, and so forth. As another example, while a person working in a physical office space may hang a "do not disturb" sign during an important call or meeting and hope that coworkers comply with this request, a person working in a virtual office space described herein may enjoy full control to completely disallow any incoming communications that could be disruptive during the call or meeting. As yet another example, while a person working in a physical office space may not differentiate between different individuals or types of coworkers (e.g., supervisors versus subordinates, etc.) in indicating his or her availability status, methods and system described herein allow a person working in a virtual office space to indicate full availability (e.g., an "open door") to certain coworkers such as supervisors while indicating that he or she would like not to be disturbed (e.g., a "closed door") by other coworkers such as peers or subordinates.

Shared virtual office spaces of organizations like companies or firms provide a convenient illustrative use case for the types of spaces where systems and methods described herein may be highly effective and helpful. However, it will be understood that principles described herein may also be applied to various other types of shared virtual spaces for various other types of use cases as may serve a particular implementation. For example, such spaces and applications may include entertainment spaces (e.g., a virtual theater for screening a movie for a virtual film festival, a virtual sports box for watching a sporting event with friends, etc.), virtual convention venues (e.g., virtual spaces configured to host large-scale conferences, forums, trade shows, rallies, or other conventions, etc.), spaces configured with games and/or other interactive events (e.g., used for hosting family or class reunions, virtual birthday parties, etc.), and/or any other shared virtual spaces as may serve a particular implementation.

Additional use cases that may be served by systems and methods described herein may relate to applications such as control room applications (e.g., used during and after an event to oversee the event and make sure it goes as planned), health care applications (e.g., to help patients move through prescribed steps during a visit such as checking in, talking to the doctor, checking out, etc.), help desk applications (e.g., allowing people to virtually walk up to a virtual information technology ("IT") help desk or corporate security desk), education applications (e.g., used to support study groups, labs and higher education classes, etc.), team building applications, hybrid applications (e.g., in which users in a physical office space interact with remote users not in the physical office space), human resources applications (e.g., to facilitate employee onboarding, recruiting, compensation negotiations, etc.), and/or any other applications as may serve a particular implementation.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for indicating location status and availability status within a communication interface may provide any of the benefits mentioned above, as well as various additional and/or alternative benefits that will be described and/or made apparent below.

FIG. 1 shows an illustrative communication provider system 100 ("system 100") configured to indicate location status and availability status within a communication interface in accordance with principles described herein. System 100 may be implemented by computer resources such as processors, memory facilities, storage facilities, communication interfaces, and so forth. In some examples, system 100 may be implemented by user equipment (UE) devices such as personal computers, mobile devices, communication devices, or other equipment used directly by end users. Additionally or alternatively, certain or all aspects of system 100 may be implemented by computing systems that are not directly used by users, such as data servers configured to provide communication services, distributed computing systems operated by a communications provider (e.g., multi-access edge computing (MEC) servers), distributed computing systems operated by a cloud-computing provider (e.g., multi-access cloud servers), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with indicating location status and availability status within a communication interface as described herein and/or as may serve a particular implementation.

Figure 2:
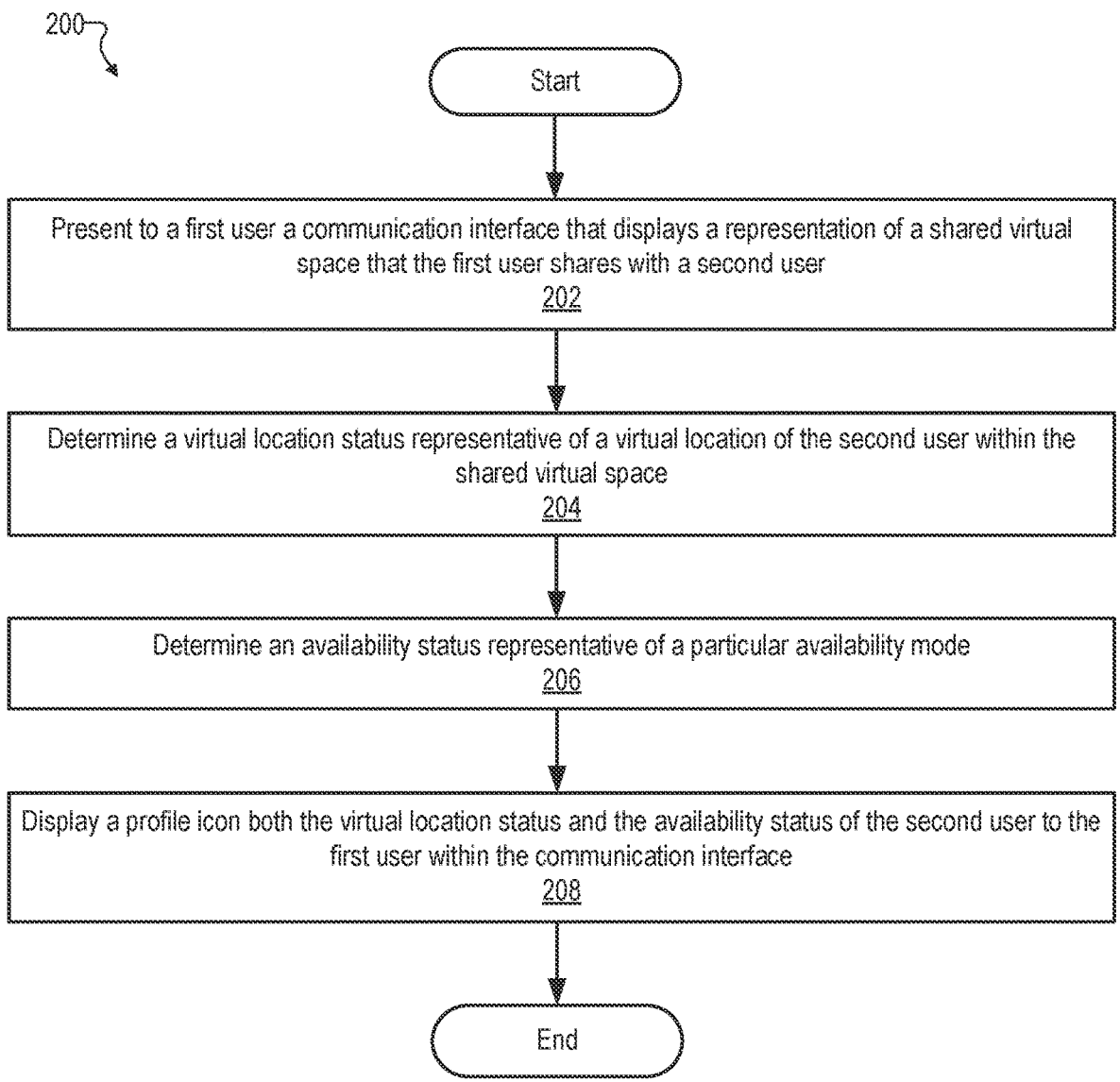
FIG. 2 shows an illustrative method for indicating location status and availability status within a communication interface in accordance with principles described herein.

As one example of functionality that processor 104 may perform, FIG. 2 shows an illustrative method 200 for indicating location status and availability status within a communication interface in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a communication provider system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may present a communication interface to a first user. The communication interface may display a representation of a shared virtual space that the first user shares with a second user. For example, the shared virtual space may be implemented as a virtual office space or another suitable virtual space (e.g., including any of the virtual spaces configured to support any of the applications or use cases mentioned herein) that is shared by a plurality of users including the first and second users. The users sharing the shared virtual space may be located remotely from one another such as by being located in their respective homes as they telecommute to a virtual office. In some examples, one or more users may be present in a physical office while one or more other users may be remotely logged in from other locations (e.g., telecommuting from home, etc.).

At operation 204, system 100 may determine a virtual location status for the second user. The virtual location status may be representative of a virtual location of the second user within the shared virtual space such that the status indicates not only that the second user is online (e.g., logged in to the communication interface, etc.) but also where the second user is located within the shared virtual space. For instance, the second user may be virtually located within his or her virtual workspace (in which case the first user may decide to temporarily abstain from communicating so as not to interrupt the workflow of the second user), within a virtual break room or in the workspace of another user (in which case the first user may decide it is a good time to communicate with the second user), within a virtual meeting room, or in another location within the shared virtual space.

At operation 206, system 100 may determine an availability status for the second user. The availability status may be representative of a particular availability mode included in a plurality of selectable availability modes. For example, various types of communication may be supported by system 100 and the selectable availability modes may each indicate different types of communication (or combinations of such) that a user is available to engage in at a particular time. Certain types of communication supported by system 100 may be communication sessions that are pre-initiated before beginning. For example, audio-only calls and video calls are communication sessions that are formally initiated by one user placing the call and another user receiving (i.e., answering or accepting) the call. Similarly, extended reality (e.g., virtual reality) communication sessions may be initiated in certain implementations by users entering an extended reality communication mode and putting on head-mounted extended reality presentation devices to communicate in a manner that more closely replicates in-person communication. As another example, audio or video meetings between groups of people are formally initiated by one person setting up the meeting (e.g., sending out invitations, etc.) and each participant joining the meeting. As yet another example, various types of textual messaging exchanges (e.g., email, instant messaging exchanges, text chats, SMS or MMS messaging exchanges, etc.) may be initiated by a user opening a messaging application to check messages, by a dialog box (e.g., pop-up window) automatically being presented for the messaging exchange, or the like.

Other types of communication supported by system 100 may not be formally-initiated communication sessions as such, but rather may involve impromptu communication that is spoken and delivered without either the speaker or listener performing any explicit action to transmit or accept the communication. For instance, one user may simply begin to speak (without any formal initiation of a communication session) and the voice communication may be delivered to the second user based on a virtual proximity of the first user to the second user within the shared virtual space (provided that the second user has an availability status that allows for such impromptu communications).

The plurality of selectable availability modes may differentiate between different types of communication and/or between formally-initiated communication sessions and impromptu communications in any suitable way. For example, as will be described in more detail below, one selectable availability mode may indicate that a user is available for any type of communication session or impromptu communication, another availability mode may indicate that the user is unavailable for impromptu communication but available for formally-initiated communication sessions, and yet another availability mode may indicate that the user is unavailable for either impromptu communications or formally-initiated communications sessions. Moreover, as will be described in more detail below, selectable availability modes may differentiate between different types of communication sessions (e.g., indicating availability for an audio-only call but unavailability for a video call), may indicate different availability for different users (e.g., indicating full availability to supervisors but limited availability to subordinates, etc.), or may otherwise be flexibly customized in any suitable way.

At operation 208, system 100 may display a profile icon for the second user within the communication interface presented to the first user. Specifically, the profile icon may indicate both the virtual location status determined at operation 204, as well as the availability status determined at operation 206. This status information may be integrated into the profile icon in any manner as may serve a particular implementation. For example, as will be illustrated and described in more detail below, the profile icon presented to the first user may be placed at a particular location on a map representative of the shared virtual space to indicate the location status (e.g., the profile icon moving around on the map as the second user virtually moves about within the shared virtual space). The profile icon may also use color, size, shape, animation, or other design elements to indicate the availability status of the second user to thereby facilitate the first user in deciding the most appropriate time and manner in which to communicate with the second user.

Figure 3:
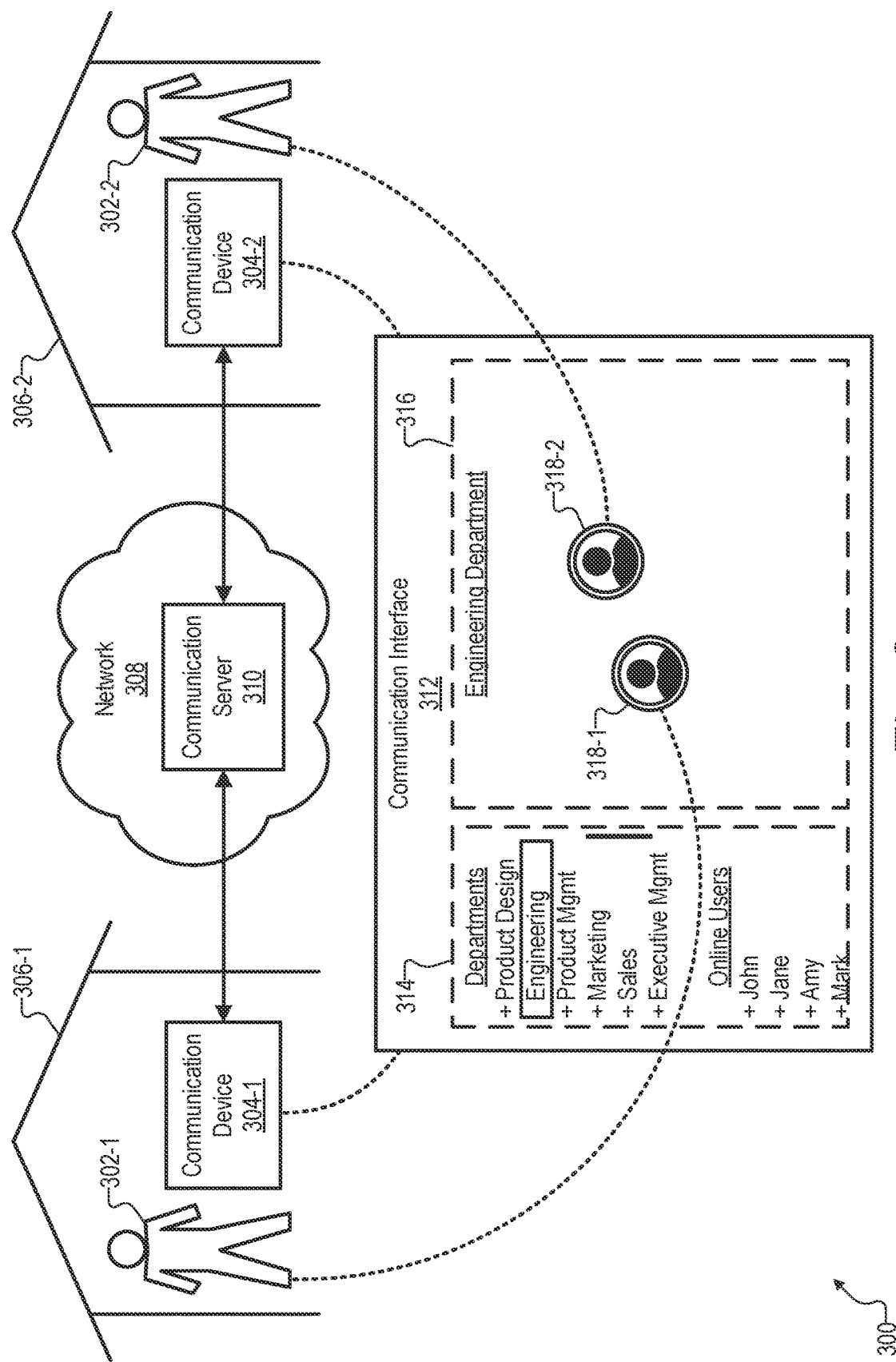
FIG. 3 shows an illustrative configuration in which the communication provider system of FIG. 1 may operate in accordance with principles described herein.

FIG. 3 shows an illustrative configuration 300 in which system 100 may operate in accordance with principles described herein. Specifically, as shown, configuration 300 shows first and second users 302 (i.e., users 302-1 and 302-2) that use respective communication devices 304 (i.e., communication devices 304-1 and 304-2) to communicate from different remote sites 306 (i.e., sites 306-1 and 306-2) over a network 308 that may employ a communication server 310 to facilitate or manage the communication. An implementation of system 100 may be implemented within either or both communication devices 304, within communication server 310 or components of network 308, or by computing resources spread across a combination of these and/or other suitable systems and devices. In certain examples, each communication device 304 may be associated with (e.g., may implement or be communicatively coupled with) a respective implementation of system 100 that may function in similar ways to provide communication capabilities for the respective users 302 using the communication devices 304.

Also shown in configuration 300 is a communication interface 312 (also referred to as a virtual communication portal) that may be generated or otherwise provided by system 100 to be presented to users 302 by way of communication devices 304. As shown, communication interface 312 may include a navigation panel 314 and a shared virtual space 316 that includes different profile icons 318 (e.g., a profile icon 318-1 associated with user 302-1 and a profile icon 318-2 associated with user 302-2) depicted at different locations within shared virtual space 316.

Within a configuration such as configuration 300, system 100 may perform method 200 and/or other operations described herein. Certain aspects of components depicted in configuration 300 will now be described in more detail.

Users 302 may represent persons who are using system 100 in any suitable way, such as to communicate with one another or with other users who are not explicitly shown in configuration 300. For example, users 302 may represent employees of an organization (e.g., a company) who are working from home and need to communicate with one another and/or with other employees (e.g., other employees working from home, employees working from the office, etc.) as part of their work assignments. Users 302 may use their respective communication devices 304, which may be implemented by user equipment devices such as mobile devices (e.g., smartphones, tablet devices, etc.), personal computer devices (e.g., laptop or desktop computers, etc.), or other such devices that are used by users 302 to perform work-related tasks or otherwise to communicate as may be desirable for a particular communication application or use case. In certain examples, communication devices 304 may be implemented or communicatively coupled with head-mounted or other types of extended reality presentation devices that may be worn by users 302 to experience extended reality communication sessions.

In the example of configuration 300, sites 306 may be understood to represent two unrelated sites that are remote from one another. For example, sites 306 may represent the respective homes of users 302, which may be at different addresses nearby one another (e.g., in the same city, etc.) or across the country or the world from one another. As another example, one or both of sites 306 may represent remote workspaces other than home in which users 302 are working at a given time. For instance, sites 306 may represent college campuses, coffee shops, temporary office spaces, or the like. In certain cases, sites 306 may represent different physical offices that are operated (e.g., owned or leased) by a particular organization, such as different offices of the organization located in different cities. Sites 306 may also represent different offices within the same building (e.g., an apartment building, a physical office building) if the sites are remote enough from one another that it is desirable for users 302 to communicate electronically using communication interface 312 rather than in person. Additional examples of sites from which users 302 may communicate using a communication interface will be described in more detail below.

Network 308 may be implemented by any suitable network or networks that include any elements or technologies as may serve a particular implementation. For instance, network 308 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 308 may include elements of various interconnected networks that are outside of any provider network and outside the control of any provider of such a provider network. Elements of the Internet, a wide area network, a content delivery network, and/or any other suitable network or networks are examples of other elements that may be included within network 308. Any of these provider or non-provider networks or network elements may provide data delivery between communication devices 304-1 and 304-2.

Communication server 310 may be communicatively coupled to either or both of communication devices 304 by way of network 308 and may facilitate communications between communication devices 304 in any manner as may serve a particular implementation. For instance, in certain implementations, communication server 310 may represent a MEC server device, cloud server device, or other distributed computing device that manages communication data between communication devices 304 in the ways described herein. As mentioned above, in certain examples, system 100 may be fully or partially implemented by communication server 310. In other examples, implementations of system 100 may exist on each of communication devices 304 and communication server 310 may be omitted or perform other operations to facilitate the communication provided by communication device 304. In some implementations, multiple communications servers 310 may be employed in a distributed fashion, such as for purposes of scalability, redundancy, and service quality (e.g., latency reduction), and system 100 may be deployed across such multiple communications servers 310.

Figure 4:
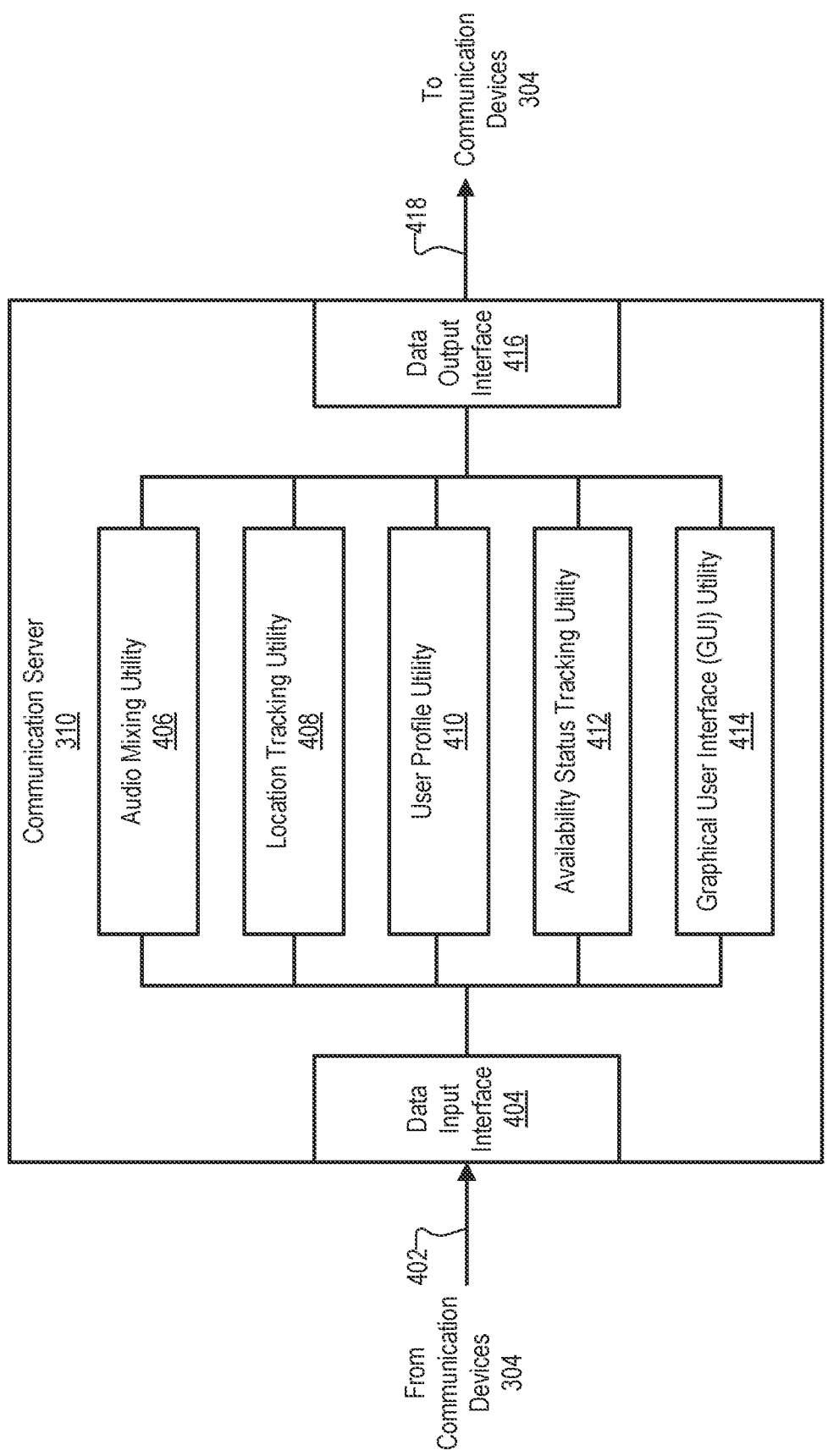
FIG. 4 shows an illustrative implementation of a communication server such as is included in the configuration of FIG. 3 in accordance with principles described herein.

To illustrate one particular way that communication server 310 may be implemented in certain embodiments, FIG. 4 shows an illustrative implementation of communication server 310 that includes various data inputs, data outputs, communication interfaces, and processing utilities to perform operations described herein. Specifically, as shown in FIG. 4, this implementation of communication server 310 receives input data 402 from one or more communication devices 304 using a data input interface 404, which provides relevant input data to an audio mixing utility 406, a location tracking utility 408, a user profile utility 410, an availability status tracking utility 412, and a graphical user interface ("GUI") utility 414. As shown, each of these and/or any other utilities not explicitly shown may communicate with one another by way of a service bus or another suitable architecture or form of communication. Audio mixing utility 406 may generate audio data, while GUI utility 414 may generate and/or update user interface data (e.g., video data) for display in a graphical user interface such as communication interface 312. As shown, this audio data and user interface data may be provided to a data output interface 416 that provides this information to communication devices 304 as output data 418. Each of the components shown in FIG. 4 will now be described in more detail.

Input data 402 may include any suitable data received (e.g., transmitted in real time) from one or more communication devices such as communication devices 304-1 and 304-2 shown in configuration 300. Input data 402 may include audio data such as voice data representative of impromptu communication being spoken by one of users 302 or voice data that is part of a communication session such as a voice or video call or an extended reality communication session. Input data 402 may also include other types of user input data and/or metadata that may, for instance, indicate when a user 302 logs into the communication portal, where a user 302 desires to set and/or move the location of his or her profile icon 318, whether a user 302 is available for various types of communication, a request to initiate a communication session (or an acceptance of such a request from another user), preference settings for how the communication interface is to be presented, profile information associated with the user, and so forth.

Data input interface 404 may receive input data 402 by way of a network such as network 308. As such, data input interface 404 may be configured to communicate with communication device 304 by way of any technologies and/or protocols supported by the network as may serve a particular implementation. In some examples, data input interface 404 may preprocess, sort, and/or steer input data 402 to utilities 406-414 to ensure that each utility receives any input data that is relevant to the function of that utility.

Audio mixing utility 406 may receive and process audio input data (e.g., by way of data input interface 404) and output audio data (e.g., by way of data output interface 416) that is to be presented to different users 302 by their respective communication devices 304. As such, audio mixing utility 406 may receive data from location tracking utility 408 (e.g., to determine where a particular user's profile icon is located in relation to other users' profile icons to properly mix impromptu, extended reality, and/or other location-sensitive types of communication), user profile utility 410 (e.g., to determine if a user is logged in, is engaging in a formally-initiated communication session, etc.), availability status tracking utility 412 (e.g., to determine whether the particular user is available to receive certain types of communication), and/or other utilities (e.g., including utilities not explicitly shown in FIG. 4) as may serve a particular implementation.

As with each of the utilities shown in FIG. 4, it will be understood that audio mixing utility 406 may be implemented by dedicated or shared hardware and/or software of communication server 310 to implement functionality described herein. For instance, in certain examples, a single processor (or group of processors) associated with communication server 310 may execute software instructions to implement audio mixing utility 406 and one or more additional utilities shown in FIG. 4 (including all of the utilities in certain examples). In other examples, each utility may be implemented by a separate server or server component (e.g., each being associated with a dedicated processor or the like) as may serve a particular embodiment.

As certain implementations of audio mixing utility 406 combine different sounds together into a single mix to be presented to a particular user (e.g., a mix including different location-sensitive communications from around the shared virtual space, etc.), audio mixing utility 406 may be configured to apply various filtering techniques, proximity effects, and so forth. For instance, in certain examples, a stereo mix may be provided to a particular communication device 304 and audio mixing utility 406 may configure the audio data to simulate directional audio that will seem to a user to originate from a particular direction within the shared virtual space. In this way, a user may sense which direction communication (e.g., impromptu communication, extended reality communication, etc.) comes from to help the user (along with visual cues provided by the user interface) to discern who is speaking. Additionally, audio mixing utility 406 may access data representative of various aspects affecting the acoustics of the shared virtual space (e.g., the location of virtual objects such as walls, cubicle partitions, etc., in the space; the virtual materials from which such virtual objects are constructed and their acoustic properties; etc.). By taking these types of data into account, audio mixing utility 406 may simulate the impact of virtual barriers on audio propagation, accurately simulate sound propagation within the virtual environment, and so forth.

Location tracking utility 408 may receive and process user input data and provide, in real time, information regarding the virtual locations of each user included within a shared virtual space. From the time that a user logs into the communication portal until he or she logs out, location tracking utility 408 may identify, update, and/or otherwise keep track of the virtual location of the user so as to properly indicate (e.g., by way of where the profile icon for the user is placed within the shared virtual space) the location status of the user. As location tracking utility 408 generates this location data, location tracking utility 408 may provide the location data to GUI utility 414 to indicate where profile icons for each user are to be placed within the shared virtual space. Additionally, the location data may be provided to audio mixing utility 406 to inform audio mixing operations. For example, certain types of location-sensitive communication (e.g., impromptu communication, extended reality communication, etc.) may be mixed at a sound intensity level that may depend on a relative proximity of one user to another in the shared virtual space. Additionally, location data may inform the audio mix since, as mentioned above, directional audio may be generated based on a relative direction from which sound virtually originates.

Location tracking utility 408 may be provided with virtual space configuration information, and may use the virtual space configuration information to enforce rules on the locations of users (e.g., where profile icons are placed) within a shared virtual space. For example, location tracking utility 408 may access space layout information (e.g., space sizing, barrier locations and characteristics, special space characteristics for designated areas such as meeting rooms, break rooms, etc.) from a data store. Location tracking utility 408 may then enforce rules based on the space layout information. For example, location tracking utility 408 may enforce that users do not move outside the shared virtual space, that users do not move through barriers, that users do not occupy the same space at the same time, that only a certain number of users occupy a given space, and/or any other such rules as may serve a particular implementation.

User profile utility 410 may receive and process user input data so as to provide, in real time, information regarding various aspects of each user's profile and/or current status that are to be graphically reflected in the graphical user interface (e.g., represented within the profile icon for that user). For example, user profile utility 410 may maintain images representative of each different user (e.g., profile photos of the users, etc.) that may be provided for display as part of a profile icon for that user. As another example, user profile utility 410 may manage invitations and/or acceptances of communication sessions and perform various other functions described herein. Additionally, user profile utility 410 may manage various settings and/or preferences for each user (e.g., information that may be reflected in navigation panel 314 as will be described below, etc.). For instance, user profile utility 410 may track whether each user is currently online, maintain data indicating which department (or departments) each user is included in and/or where the user fits in a reporting structure of an organization, manage a setting indicating whether a particular user has stereo audio capabilities that would support directional audio capabilities such as described above, and so forth.

Availability status tracking utility 412 may receive and process additional user input data that may be explicitly provided by a user or provided automatically by a communication device to indicate the current availability status of the user. For example, if a user decides to lower his or her availability (e.g., to disable impromptu communications in order to focus on a particular task), availability status tracking utility 412 may receive data indicating this preference and adjust an availability status for the user. Similarly, if a user initiates a communication session, availability status tracking utility 412 may determine at the commencement of the communication session that the availability status for the user should be changed for the duration of the session and may automatically update the availability status accordingly. Availability status tracking utility 412 may provide the status data to any of the other utilities. For example, by providing the status data to audio mixing utility 406, audio mixing utility 406 may determine how to mix audio for each user. Additionally, availability status tracking utility 412 may provide information to GUI utility 414 to allow proper status to be reflected in the user interface (e.g., represented within the profile icons of the users, etc.) in any of the ways described herein.

GUI utility 414 may receive data from data input interface 404 and/or from various other utilities 406-412 or other sources as have been described above and may provide visual data (e.g., video data, extended reality data, data allowing for a GUI to be constructed and/or updated by communication devices 304, etc.) to each communication device 304 by way of data output interface 416. In this way, GUI utility 414 may facilitate each communication device 304 in presenting various graphical aspects of a communication interface such as communication interface 312. For example, based on all the input data received, GUI utility 414 may provide data sufficient to allow a communication device 304 to present navigation panel 314, shared virtual space 316, and/or any other panels as may be included in a particular implementation of communication interface 312. Moreover, as users move within the shared virtual space, change availability status and/or other types of status, and so forth, GUI utility 414 may continually provide information allowing each communication device to present a coherent and relevant user interface to its respective user 302.

Data output interface 416 may receive audio data, visual data, metadata, and/or any other suitable types of data from utilities 406-414, and may communicate this data as output data 418 to communication devices 304 by way of a network such as network 308. As such, like data input interface 404, data output interface 416 may be configured to communicate with communication devices 304 by way of any technologies and/or protocols supported by the network as may serve a particular implementation. In some examples, data output interface 416 may process, package, sort, address, and/or steer output data 418 to particular communication devices 304 to ensure that each communication device receives data relevant to the function of that communication device.

The components described above may be implemented in one or more communication servers 310, for example, in a distributed manner to facilitate scalability, redundancy, and service quality (e.g., latency reduction). As such, an individual communications server 310 may include one or more components described above, and may communicate amongst other communication servers 310 when necessary to access needed capabilities.

Returning to FIG. 3, communication interface 312 represents a virtual communication portal that is implemented by hardware and software of system 100 and may be presented to either or both of users 302 by way of their respective communication devices 304. For example, communication interface 312 may be presented when a user 302 logs in to his or her device or to communication server 310 at the beginning of a workday, when the user 302 authenticates himself or herself to join a convention or other event that makes use of communication interface 312, or when the user 302 otherwise comes online to begin communicating with other users by way of system 100.

Within communication interface 312, navigation panel 314 is shown to include certain categories (e.g., "Departments," "Online Users," etc.) that may facilitate a user 302 in exploring and discovering communication possibilities, filtering potential people to communicate with in various ways, and so forth. For example, as shown in FIG. 3, a section of navigation panel 314 for departments may allow a user to select a shared virtual space associated with a particular department (e.g., "Product Design," "Engineering," "Product Management," "Marketing," "Sales," "Executive Management," etc.) within the organization to see only users who are logged in and work in that department. At the moment captured by FIG. 3, for example, the "Engineering" department is shown to be selected such that shared virtual space 316 is labeled "Engineering Department" and depicts profile icons 318 that will be understood to represent employees who work for that department. In other modes of operation not shown in FIG. 3, shared virtual spaces associated with several or all of the departments could be shown within communication interface 312 at once so that all the users logged in from the entire organization could be seen at a glance.

Also shown in navigation panel 314 is an "Online Users" category that lists names of users who are online and may potentially be communicated with. Whether a particular user may be communicated with (and the manner in which communications may be provided) may be determined at least in part by an availability status of the user, which may be indicated by a color of each profile icon or name in the list, a background of each profile icon or name in the list, or in another suitable way. For online users who are available (e.g., "John," "Jane," "Amy," "Mark," etc.), navigation panel 314 may provide easy and convenient ways to initiate communications sessions such as voice or video calls between two users, virtual meetings with groups of users, and so forth. For example, by clicking on one of the online users in navigation panel 314, a user may be given a menu of options for initiating communication of various communication types with the selected user.

Shared virtual space 316 is shown in this example to represent a particular department (i.e., the engineering department, as mentioned above). As such, profile icons 318 for each user associated with the engineering department may be represented on a map of a shared virtual space representative of the engineering department. Specifically, as mentioned above and as illustrated by dotted lines, profile icon 318-1 may by associated with (i.e., may represent) user 302-1 and profile icon 318-2 may be associated with user 302-2 within shared virtual space 316. In FIG. 3, each profile icon 318 is depicted as a circular token that may include a depiction (e.g., a photo, a drawing or symbol, etc.) representative of the respective user 302. However, in certain modes (e.g., an extended reality mode, etc.), profile icons 318 may be replaced by 2D or 3D representations of the users (e.g., avatars having a 3D human form, etc.) as may serve a particular implementation. These representations may include some or all of the same information as is integrated into profile icons 318, but may be depicted in a manner that is more closely modeled to an in-person communication experience (e.g., as avatars with human forms, etc.).

Figure 5:
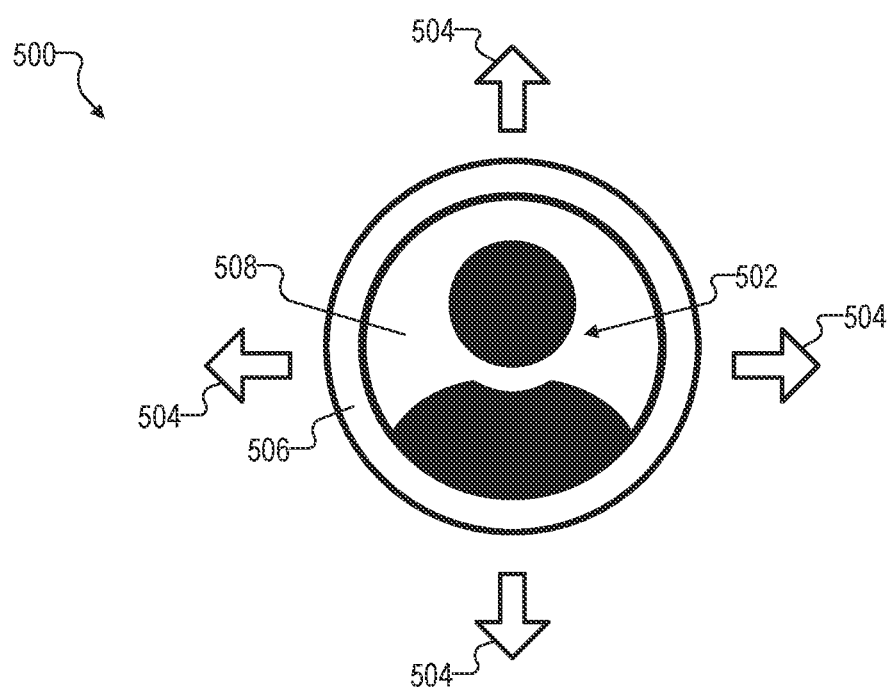
FIG. 5 shows an illustrative profile icon and various attributes thereof that may indicate status of a user within a communication interface in accordance with principles described herein.

To illustrate certain attributes that profile icons 318 may have in some implementations, FIG. 5 shows an illustrative profile icon 500 that will be understood to be representative of any of profile icons 318 or other profile icons described herein. As shown, profile icon 500 illustrates various attributes that a profile icon may have to indicate various types of status of a user (e.g., virtual location status, availability status, etc.) within a communication interface. Specifically, an identity attribute 502 may indicate an identity of the user represented by profile icon 500, a placement attribute 504 may indicate a virtual location status of the user, and appearance attributes of a border 506 and/or a background 508 may indicate other status of the user such as an availability status, an activity status, or the like. Each of these attributes will now be described in more detail.

Identity attribute 502 may indicate the identity of the user in any suitable way, such as by including an image representing the user included within the profile icon. The image may be a likeness of the user (e.g., a photograph of the user, a drawing of the user, an avatar created by the user with certain characteristics of the user such as hair and eye color and the like, etc.) or another suitable image that represents the user (e.g., a drawing or symbol selected by the user to represent themselves, etc.). In certain examples, an image implementing identity attribute 502 may be a static image. In other examples, the image may be animated or dynamic. For instance, an animation may play when a cursor hovers over the image or when the user is detected to be speaking. In certain examples, the identity attribute may include a live video feed of the user (e.g., captured by a webcam on the communication device of the user) or another video representation.

Placement attribute 504 is shown in FIG. 5 by arrows pointing in various directions away from profile icon 500 to represent that profile icon 500 may be placed in various locations within a shared virtual space of a communication interface. Profile icon 500 may indicate the virtual location status of the user it represents based on placement attribute 504 with respect to the representation of the shared virtual space by, for example, being placed at a location within the shared virtual space that the user selects for his or her present virtual location. The virtual location selected by a user may affect a user's experience in several ways. As one example mentioned above, audio mixing for the user may be affected by the virtual location of the user in relation to other users since, for instance, impromptu communications may be louder when other users are more proximate to the user. Extended reality communication sessions also may be highly location dependent since other users will be viewed and heard in accordance with where they are located within the shared virtual space relative to the user. As another example that will be described in more detail below, certain types of communication may take place in certain dedicated spaces that a profile icon may be transported to while engaging in that type of communication. For instance, virtual meeting rooms, break rooms, extended reality collaboration rooms, and so forth may be used for certain types of communications, and profile icons of users engaged in such communications may be placed in those rooms as the communication is ongoing.

Border 506 is shown in FIG. 5 as a ring that completely encircles the image of identity attribute 502. In some examples, border 506 may extend only partially around the image (but not completely around the image) and/or may take any suitable shape other than the circular form shown in FIG. 5 (e.g., an elliptical shape, a rectangular shape, etc.). One or more appearance attributes of border 506 may indicate an availability status of the user represented by profile icon 500 in any suitable way. For instance, in certain implementations, an appearance attribute implemented by a color of border 506 may indicate the status of the user (e.g., a green color indicating one level of availability, a yellow color indicating another level of availability, a red color indicating yet another level of availability, etc.). In other examples, in addition or as an alternative to the color attribute, appearance attributes such as a thickness of border 506, a shape of border 506, an animation of border 506 (e.g., a pulsating animation, a rotating animation, etc.), or another such characteristic of the appearance of border 506 may be used to indicate the availability status.

Along with indicating the availability status of the user, other types of status may also be indicated by appearance attributes of profile icon 500 such as appearance attributes of border 506. As one example, different types of activity statuses that may be indicated may include whether a user is physically sitting at his or her desk and/or using his or her communication device, whether a user is actively engaging with content (e.g., reading text, creating content such as by typing or drawing, etc.), what type of content the user is engaging with (e.g., work-related content, personal content, entertainment content, etc.), whether a user is currently speaking, and/or any other type of status related to the user's current activities. As with the availability status, different types of activity status may be indicated by way of various appearance attributes such as color attributes, shape attributes, animated attributes, attributes that are revealed only when a cursor hovers over the profile icon, or the like.

As mentioned above, by indicating not only an availability status but also one or more types of activity statuses, a profile icon may not only indicate whether a user is ostensibly available to communicate (e.g., because the user is not engaged in another communication session and has not selected an availability mode indicating that the user is not to be disturbed), but may also help provide more subtle social cues to allow other users to appropriately plan when and how they approach the user with different types of communication (e.g., formal work-related communication, informal friendly communication, important communication that will take significant time, trivial communication that will be very brief, etc.).

Together with or instead of appearance attributes of border 506, profile icon 500 may indicate any of the types of status described above using other appearance attributes such as one or more appearance attributes of background 508. For instance, if the image of identity attribute 502 is a headshot as shown, a background of the headshot may be replaced by a certain color, pattern, or other appearance attribute that is configured to indicate one or more status characteristics in similar ways as described above for border 506.

In some examples, communication sessions may be initiated by clicking directly on profile icons 500 (e.g., by way of a pop-up menu, etc.) in addition or as an alternative to communication initiated by way of navigation panel 314 in the ways described above. Additionally, a location of one user's profile icon may be set by clicking on another profile icon or a particular location within a shared virtual space to move to that location.

As has been mentioned, methods and systems described herein for indicating location status and availability status within a communication interface may find application in various contexts and with various use cases. With that understood, various example implementations referred to throughout this description include implementations in which the shared virtual space is a virtual office space associated with an organization employing a workforce of employees and each employee in the workforce is associated with a different profile icon represented in the virtual office space when the employee is logged into a virtual communication portal.

Figure 6B:
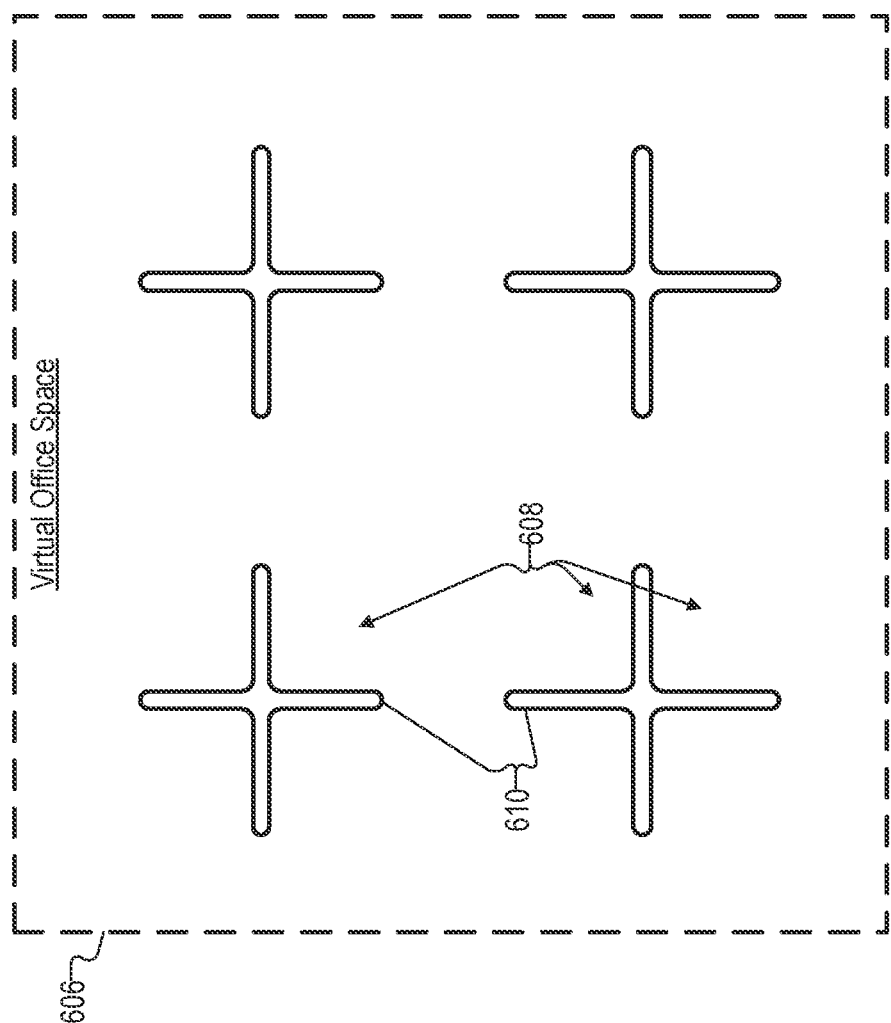
FIG. 6B shows an illustrative virtual office space in which profile icons representing employees from the workforce of FIG. 6A may be virtually located in accordance with principles described herein.
Figure 6A:
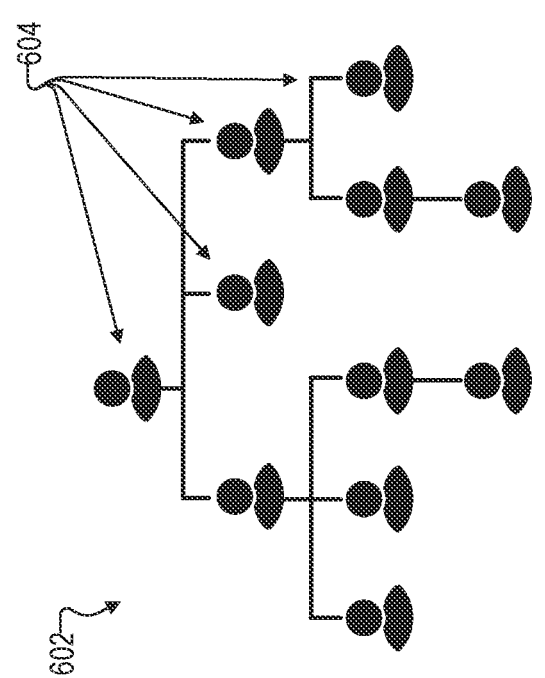
FIG. 6A shows an illustrative organization that employs a workforce of employees in accordance with principles described herein.

To illustrate, FIG. 6A shows an illustrative organization 602 that employs a workforce of employees 604 in accordance with principles described herein. Organization 602 may be any type of organization of people, created for any purpose and structured in any manner, as may serve a particular implementation. For example, organization 602 may be a commercial organization such as a company or corporation, a non-profit organization such as a charity or church, a governmental organization, a services organization such as a firm (e.g., a law firm, a consulting firm, etc.) or practice (e.g., a medical practice, etc.), or any other type of organization as may serve a particular implementation.

As shown, employees 604 within organization 602 may be organized according to a reporting structure, such that one or more employees of the organization are in top leadership roles (e.g., executive leaders, presidents, board members, etc.) while other employees are in lower leadership roles (e.g., middle management) and still other employees report to the leadership. As a result, the structure may include several levels that each have one or more employees working as peers, reporting to a particular supervisor, and so forth. It will be understood that employees 604 may be users of a virtual communication portal such as communication interface 312. For instance, one of employees 604 may act as user 302-1 and another employee 604 may act as user 302-2 in a communication scenario such as illustrated by configuration 300 of FIG. 3. While a relatively small number of employees is illustrated in FIG. 6A, it will be understood that organization 602 may, in certain examples, include hundreds or thousands of employees 604 structured in highly complex ways according to the needs of the organization.

FIG. 6B shows an illustrative virtual office space 606 within which profile icons representing employees 604 from the workforce of FIG. 6A may be virtually located in accordance with principles described herein. While no profile icons are explicitly shown in FIG. 6B (different illustrations of virtual office space 606 are illustrated below in which profile icons are depicted in various locations throughout the virtual space), FIG. 6B shows various other aspects of virtual office space 606. Specifically, virtual office space 606 is shown to include individual workspaces 608 assigned to particular employees (e.g., analogous to desks, cubicles, offices, etc. in a physical office space). Virtual office space 606 also shows partitions 610 that define workspaces 608 so as to be arranged in groups (e.g., analogous to desk clumps in a physical office space) such that employees working on the same project or otherwise sharing common attributes may virtually work near one another for convenient access to one another (e.g., to build team camaraderie, to share ideas and/or ask questions of each other, etc.).

While not shown in FIG. 6B, it will be understood that, in certain implementations, different rooms (e.g., private offices, meeting rooms, break rooms, dedicated extended reality collaboration rooms, etc.) may be included as separate rooms off of the main area of the office space that includes workspaces 608 and partitions 610. While FIG. 6B shows a top view of virtual office space 606 with relatively few details (e.g., partitions 610, etc.), certain implementations or settings may cause virtual office space 606 to be presented in other ways with any number or type of objects to decorate and outfit the space in any manner as may serve a particular implementation. For example, rather than the top view of virtual office space 606 illustrated in FIG. 6B, certain implementations may employ a perspective or isometric view that provides a greater sense of depth and dimensionality for the virtual space. In some examples, different types of representations (e.g., the top view, the isometric view, etc.) may be selected and switched between according to user preference. Additionally, different style treatments may be applied to certain implementations, including user-selectable style treatments (e.g., "skins") in some embodiments. For instance, one style treatment may be a minimalistic style that emphasizes the relative locations of users within the space and shows little other detail (as shown in FIG. 6B), while other style treatments may include more immersive levels of detail (e.g., color and/or texture options for flooring, walls, desks, etc.), additional decorations (e.g., plants, desk chairs and other furnishings, water coolers, objects placed on desks, etc.), and so forth. The characteristics of the entities described above in the shared virtual space (e.g., location, styling, identifiers, etc.) may be stored, for example, in a data store accessible to location tracking utility 408 and/or GUI utility 414 such that the rendering of the visual representations of these entities may be correctly placed in the shared virtual space and the appearance may be presented in accordance with the appropriate style treatments.

Figure 7A:
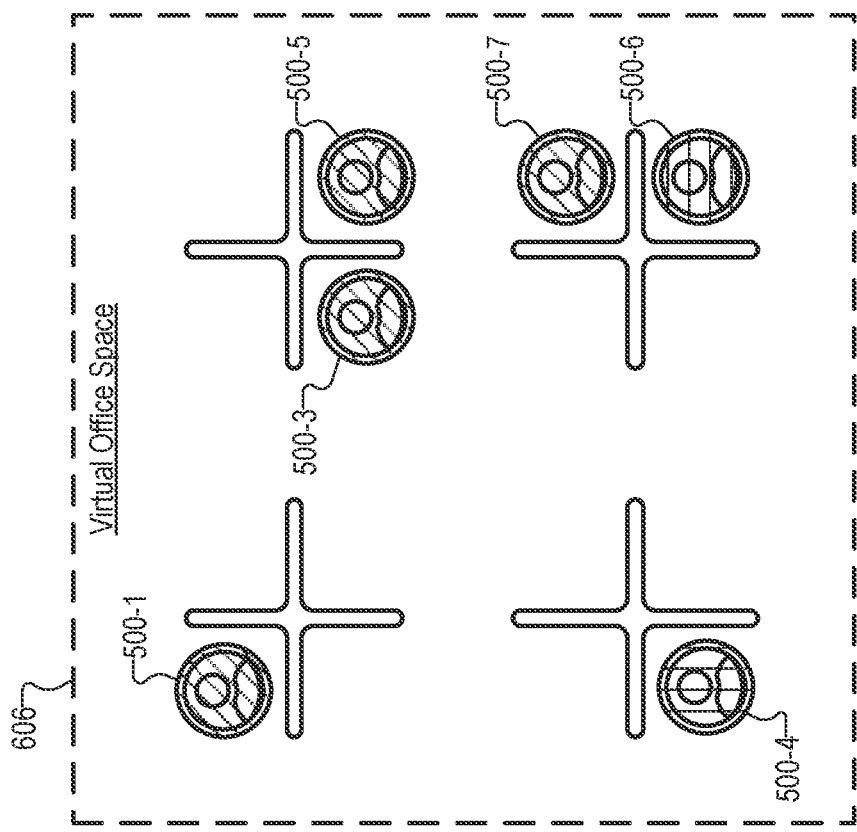
Figure 7B:
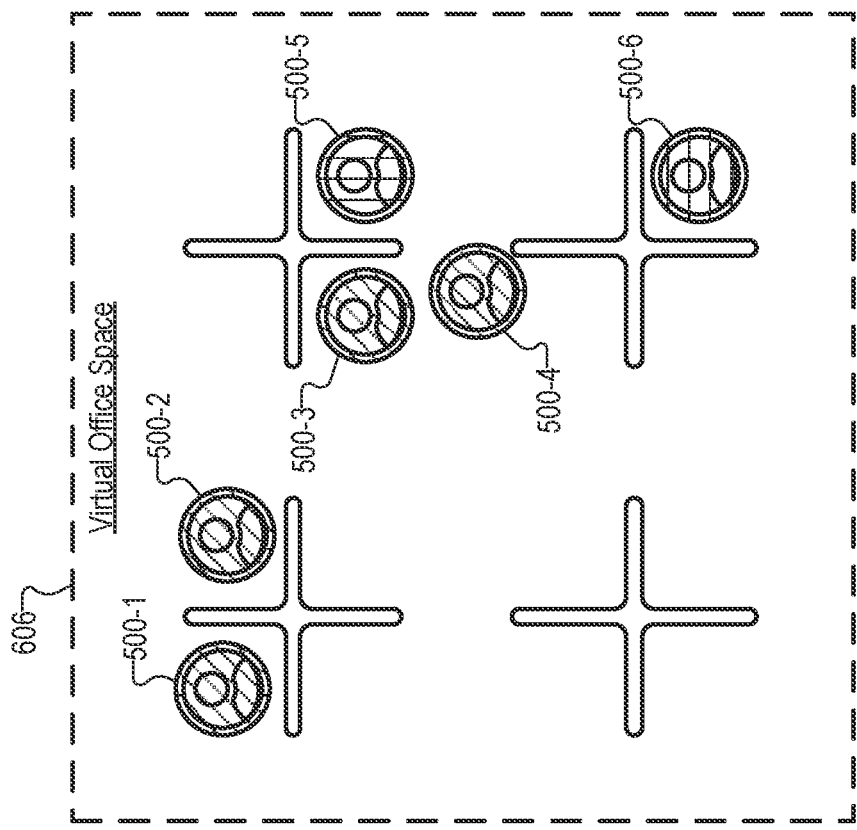

FIGS. 7A and 7B show illustrative aspects of how profile icons depicted within virtual office space 606 may indicate different types of statuses for different users within a communication interface such as communication interface 312. As shown, FIG. 7A includes a first representation 700-T1 of virtual office space 606, which will be understood to represent the space at a first time T1. FIG. 7B includes a second representation 700-T2 of virtual office space 606, which will be understood to represent the space at a second time T2 (e.g., a subsequent time later in the day from T1, etc.). Both representations 700 (i.e., representations 700-T1 and 700-T2) are shown to be similar to the view of FIG. 6B and will be understood to include the same objects (e.g., partitions, workspaces, etc.) described in connection with that figure, though each virtual object is not explicitly labeled in FIGS. 7A and 7B.

Within each of representations 700, users who are online and participating with the communication interface provided by system 100 are represented by respective profile icons 500 (e.g., profile icons 500-1 through 500-6 in FIG. 7A, profile icons 500-1 and 500-3 through 500-7 in FIG. 7B). It will be understood that each profile icon 500 may represent a different user who is not shown in FIG. 7A or 7B but will be understood to be represented by his or her profile icon 500 in the ways that have been described.

For example, as shown, virtual location status for each user is indicated by the profile icons 500 based on the placement of the profile icons within virtual office space 606. Specifically, users represented by profile icons 500-1 and 500-2 are shown to be virtually located within respective workspaces assigned to them in the virtual office space, a user represented by profile icon 500-3 is shown to be at his or her workspace and to be getting a visit from a user represented by profile icon 500-4 (e.g., such that these users may be engaging in impromptu communication). Users associated with profile icons 500-5 and 500-6 are also shown to be virtually located at respective workspaces in different parts of virtual office space 606.

Along with placement attributes indicating the virtual locations of each user, profile icons 500 are also shown to have appearance attributes that indicate other types of status, such as availability status. In certain implementations (as described above in relation to FIG. 5), the appearance attributes used to indicate these types of status may be limited to certain parts of the profile icons such as the border or the background. However, for clarity of illustration, FIGS. 7A and 7B (as well as other figures described below) use hatching pattern attributes over the entirety of the profile icons 500 to represent three illustrative availability statuses that will now be described.

First, a diagonal hatching pattern characterizing profile icons 500-1, 500-2, 500-3, and 500-4 may represent an availability status for the users associated with these profile icons that corresponds to a first availability mode of the plurality of selectable availability modes. Specifically, the first availability mode may be associated with a relatively high level of availability and may indicate that the respective users of these profile icons 500 are available to engage in an impromptu communication or to engage in any formally-initiated communication session. As such, if any user virtually located in a vicinity of one of these users speaks, the voice content may be automatically captured, delivered, and presented to the other users as impromptu communication that is not formally initiated in the way that a communication session (e.g., a phone call or meeting, etc.) would be. Additionally, if a user desires to engage in a meeting, call, or other formally-initiated communication session with any of these users, profile icons 500-1 through 500-4 indicate that the users are available for such sessions. As will be described in more detail below, the availability modes illustrated in FIG. 7A will be understood to be specific, in certain implementations, to a user to whom representations 700 are presented. As such, other users presented other representations of virtual office space 606 may see different availability status indications for one or more of the users.

Second, a vertical hatching pattern characterizing profile icon 500-5 may represent an availability status for the user associated with profile icon 500-5 that corresponds to a second availability mode of the plurality of selectable availability modes. Specifically, the second availability mode may be associated with a medium level of availability and may indicate that the user is unavailable to engage in an impromptu communication but is available to engage in a formally-initiated communication session. As such, the user represented by profile icon 500-5 may not be presented with an impromptu conversation between the users of profile icons 500-3 and 500-4 in the vicinity of profile icon 500-5. This may help the user stay focused and not be distracted by the conversation if it is not relevant to him or her. However, the second availability mode may still allow others to request and/or initiate communication sessions (e.g., calls, meetings, etc.) with the user of profile icon 500-5 so that communication that is relevant to the user may be received.

Third, a horizontal hatching pattern characterizing profile icon 500-6 may represent an availability status for the user associated with profile icon 500-6 that corresponds to a third availability mode of the plurality of selectable availability modes. Specifically, the third availability mode may be associated with a relatively low level of availability and may indicate that the user is unavailable to engage in either an impromptu communication or a formally-initiated communication session. As such, the user represented by profile icon 500-6 may not be disturbed either by impromptu conversations in his or her vicinity or by requests to initiate communication sessions. This may be helpful if the user is already engaged in an active communication session (e.g., on a call, in a meeting, etc.) or if the user wishes to stay focused and not to be disturbed by any type of communication.

Various changes are shown to occur between time T1 (associated with representation 700-T1) and time T2 (associated with representation 700-T2). For example, users may move themselves freely about virtual office space 606 to work, take breaks, approach others for impromptu conversations, and so forth. This is shown, for example, by the movement of the user represented by profile icon 500-4 from near the workspace of profile icon 500-3 at time T1 to his or her own workspace at time T2. In a similar way as an employee may walk over to a different area (e.g., a particular desk clump) of a physical office space to converse with one or more coworkers there, the user associated with profile icon 500-4 may control his or her profile icon 500-4 within virtual office space 606 to go near the workspace of other users to have conversations there, then to return to work in his or her assigned workspace, and so forth.

As another example of a change that may occur within a virtual office space, profile icons for users who are no longer present in the virtual office space (e.g., because they have signed out for the day, etc.), may be removed from the virtual office space. For example, system 100 may detect, while a particular profile icon for a particular user is being displayed, that the particular user logs out of the communication interface. In response to the detecting that the particular user logs out, system 100 may cease displaying the profile icon for the particular user within the communication interface. To illustrate, it will be considered that the user associated with profile icon 500-2 logs out of the communication interface some time between time T1 and time T2. Accordingly, as illustrated by the disappearance of profile icon 500-2, system 100 has automatically ceased displaying any profile icon for this user at time T2.

Similarly, when a user first logs in to the communication interface, a profile icon 500 for the user may be spawned, as illustrated by the appearance of a new profile icon 500-7 in representation 700-T2. It will be understood that a user who had not yet logged in at time T1 has logged in to the communication interface by the time of T2 and a profile icon 500-7 for this new user has thus been included within representation 700-T2. When a profile icon 500 first appears within a shared virtual space such as virtual office space 606, a default availability status (e.g., a status selected by the user, a status applied by the system for all users, etc.) may be associated with the user. For example, as shown in FIG. 7B, the user represented by profile icon 500-7 is shown to have a default availability status associated with the first (high availability) availability mode.

In some situations, it may be desirable for a user to select his or her availability status from a plurality of selectable availability modes such as the three illustrative modes described above in relation to FIGS. 7A-7B or other suitable modes. In other situations, it may be more useful if the user does not need to explicitly select the availability mode but if it instead is inferred automatically by system 100. For example, system 100 may operate under an assumption that any user who has commenced (e.g., initiated, accepted, begun, etc.) a formally-initiated communication session is not currently available for impromptu communication and/or other separate communication sessions. As such, system 100 may detect (e.g., during the displaying of a profile icon indicating an availability status representative of a particular availability mode) that a user represented by the profile icon commences a formally-initiated communication session with another user. Then, in response to that detecting that the user commences the formally-initiated communication session, system 100 may automatically update the availability status of the user within the displayed profile icon to represent an updated availability mode different from the particular availability mode. For example, system 100 may automatically update the availability status to indicate that the user is no longer available for impromptu communications for as long as the formally-initiated communication session is underway.

To illustrate, FIGS. 8A and 8B show additional aspects of how profile icons 500 depicted within virtual office space 606 may indicate different types of statuses for different users. Specifically, as with FIGS. 7A and 7B, FIG. 8A depicts a representation 800-T3 that is associated with virtual office space 606 at a time T3 (e.g., a time before or after times T1 and/or T2 described above), while FIG. 8B depicts a representation 800-T4 that is associated with virtual office space 606 at a time T4 (e.g., a time subsequent to time T3). At time T3, the hatching pattern of profile icons 500-1, 500-3, 500-5, and 500-7 indicates that users represented by these profile icons are available for impromptu communication as well as formally-initiated communication sessions. At the same time, the user represented by profile icon 500-4 is shown to be available only for communication sessions (and not for impromptu communications) and the user represented by profile icon 500-6 is shown to be unavailable for any type of communication (e.g., because he or she is trying to stay focused and does not wish to be disturbed by any type of communication).

At some point after time T3 and before time T4, the user represented by profile icon 500-1 may initiate a communication session with the user represented by profile icon 500-7. For instance, the first user may call the second user on an audio or video call or both users may join an audio or video meeting that the first user scheduled. At time T4, shown in representation 800-T4 of FIG. 8B, both profile icons of these users are shown to not only automatically change what availability mode they indicate (i.e., both profile icons 500-1 and 500-7 now show the fully unavailable mode), but also are moved into a virtual meeting room 802. In this way, a user may differentiate between the unavailability of the user represented by profile icon 500-6, who is at his or her desk working and does not wish to be disturbed, and the unavailability of the users of profile icons 500-1 and 500-7, who are in a meeting together. Based on this distinction, a user who knows what the meeting is about may decide to virtually walk over to the conference room (e.g., virtually knock to request entrance to the meeting) to communicate as part of the meeting rather than assuming that these users are busy and do not wish to be disturbed (as may be the case with the user of profile icon 500-6).

Virtual meeting room 802 may be dynamically spawned or generated on demand as meetings take place and may disappear again when no meeting is being conducted. In some examples, various different types of meeting rooms and/or other auxiliary rooms may also be generated in this way. For example, game rooms may be user when users wish to take a break and enjoy time playing a game together, extended reality rooms may provide special tools (e.g., virtual whiteboards, modeling objects, etc.) that allow users to collaborate and brainstorm in extended reality experiences, virtual interview rooms may be furnished and decorated differently than large conference rooms due to the different purposes of these virtual meeting rooms, and so forth.

As mentioned above, certain implementations may provide ways that different types of status (e.g., availability status, activity status, etc.) may be selected to show up in different ways to different users. For example, referring again to the first and second users described in method 200, system 100 was described (at operation 208) as displaying, for the first user within a communication interface presented to the first user, a profile icon for the second user that indicates the virtual location status and the availability status of the second user. This virtual location status and availability status may be viewed by the first user as the first user decides how and when to communicate with the second user by way of the communication interface, as was described. However, it may be the case that, while the second user wishes to present this status to the first user, there is a different status that the second user would prefer to have presented to a third user. For example, if the first user is the supervisor of the second user, the second user may desire to make himself or herself available for any type of communication with the first user. However, if the third user is a peer or subordinate of the second user that sits nearby and engages in lots of impromptu conversation that is not of interest to the second user, the second user may desire to make himself or herself unavailable for impromptu communication with the third user (e.g., so as not to be distracted by the third user's impromptu conversations, etc.).

More particularly, the availability status determined at operation 206 for the second user may be a first availability status corresponding to an availability of the second user with respect to the first user (e.g., an availability status that corresponds to a high level of availability). System 100 may also determine a second availability status for the second user (e.g., an availability status that corresponds to a lower level of availability than the first availability status). The second availability status may correspond to an availability of the second user with respect to a third user that further shares the shared virtual space with the first and second users. As such, system 100 may present, to the third user, an additional communication interface that displays a representation of the shared virtual space. Within the additional communication interface, system 100 may display a profile icon for the second user that indicates both the virtual location status and the second availability status of the second user to the third user.

To illustrate, FIG. 9 shows differences in how a status of one user (e.g., the second user in this example) may be indicated within communication interfaces presented to other users (e.g., the first and third users in this example). Specifically, as shown, two users 902 (i.e., users 902-1 and 902-3) are shown to represent the first and third users described in the example above. Users 902 are shown to be using respective communication devices 904 (e.g., a communication device 904-1 used by user 902-1 and a communication device 904-3 used by user 902-3) to view respective representations 906 (e.g., representation 906-1 presented to user 902-1 and representation 906-3 presented to user 902-3) of virtual office space 606. A symbol 908 between the respective configurations of user 902-1 and user 902-3 indicates that users 902-1 and 902-3 may be in different locations (e.g., in their respective homes as they telecommute into virtual office space 606, etc.).

Within each representation 906 of virtual office space 606, respective profile icons 500 are shown for first user 902-1 (profile icon 500-1), for third user 902-3 (profile icon 500-3), and for the second user who is not shown in FIG. 9 (profile icon 500-2). However, as shown, while profile icon 500-2 is shown in representation 906-1 to indicate to user 902-1 one particular availability mode for the second user (e.g., the fully available mode represented by the diagonal hatching pattern), profile icon 500-2 is shown in representation 906-3 to indicate to user 902-3 a different availability mode for the second user (e.g., a lower availability mode represented by the horizontal hatching pattern). As such, users 902-1 and 902-3 are shown different availability statuses for the second user and may hence choose (and/or be allowed by system 100) to communicate with the second user in different ways, at different times, and/or with different limitations.

Figure 10:
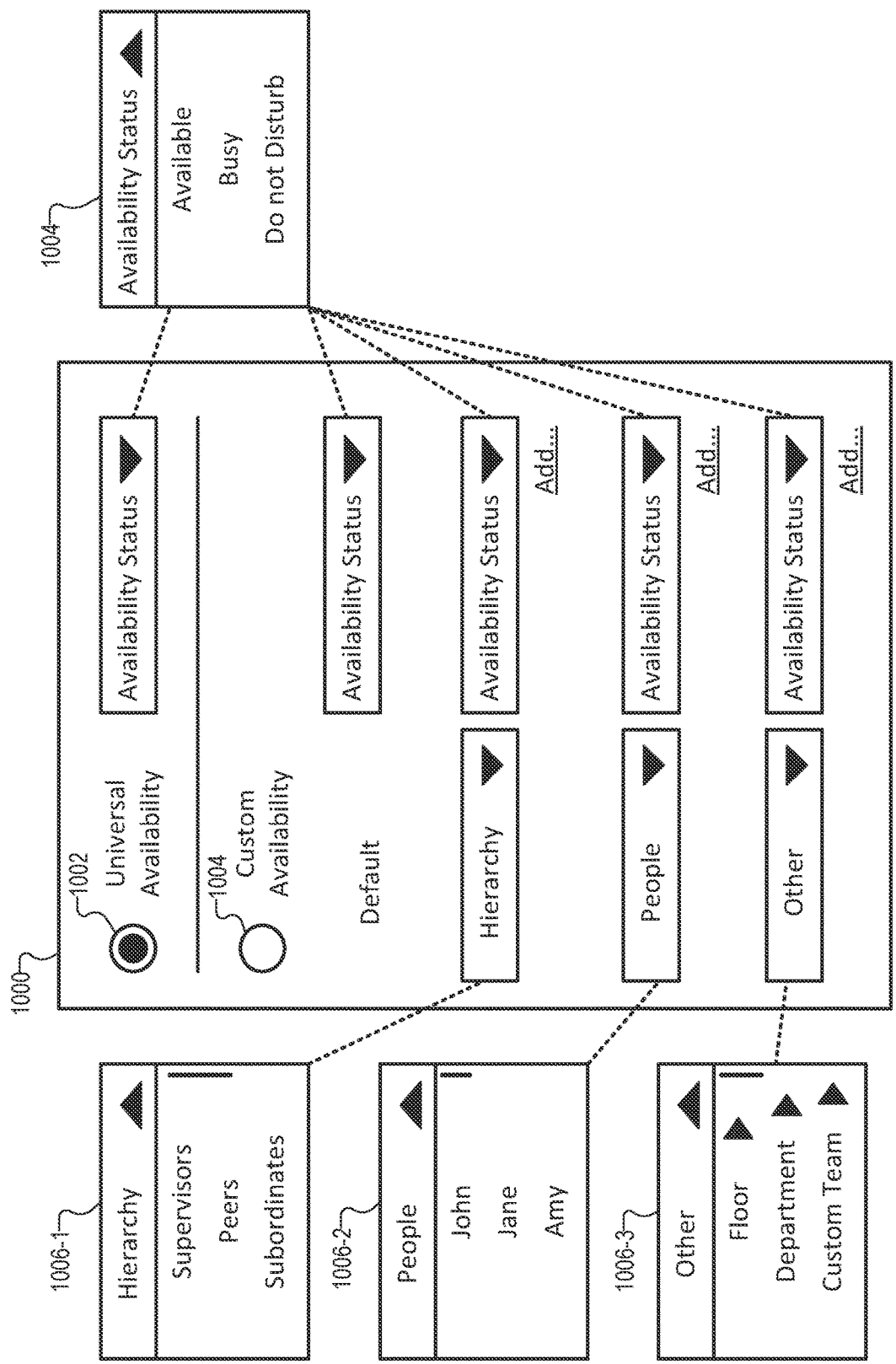
FIG. 10 shows an illustrative user interface configured to facilitate a user in setting and/or customizing an availability status in accordance with principles described herein.

FIG. 10 shows an illustrative user interface 1000 that may be used by system 100 to facilitate a user (e.g., the second user in the example above) in setting and/or customizing his or her availability status in accordance with principles described herein (e.g., as was illustrated in the example of FIG. 9). It will be understood that user interface 1000 broadly illustrates certain principles that may be provided to users by a user interface serving this purpose and that various features, functions, and interface elements may be provided to similar effect in any manner as may serve a particular implementation.

As shown, radio buttons 1002 (i.e., radio buttons 1002-1 and 1002-2) may allow a user to select between a "Universal Availability" mode (radio button 1002-1) in which the user may select an availability status that will be used across the board for all users and a "Custom Availability" mode (radio button 1002-2) in which the user may customize different availability statuses to be used for different users or groups of users. One of these radio buttons may be selected at a time in this example and it is shown that radio button 1002-1 is currently selected such that the corresponding availability status will be used globally and the settings in the custom availability section may be disabled (e.g., grayed out, etc.) until radio button 1002-2 is selected.

An "Availability Status" drop-down selection menu 1004 is shown to provide certain availability modes including an "Available" mode (e.g., the first mode described above in which both impromptu communications and formally-initiated communication sessions are allowed), a "Busy" mode (e.g., the second mode described above in which impromptu communications are disallowed but formally-initiated communication sessions are allowed), and a "Do not Disturb" mode (e.g., the third mode described above in which both impromptu communications and formally-initiated communication sessions are disallowed). It will be understood that these options are examples only and that more or fewer availability modes may be presented as options in a particular implementation. For example, certain availability modes that may be offered may differentiate between different types of communication sessions such that, for example, a user may select a mode that indicates availability for audio-only communication sessions but not video communication sessions, a mode that indicates availability for pre-scheduled meetings but not sessions that have not been scheduled, or the like. Moreover, it will be understood that selection menu 1004 may be replicated not only for allowing selection in the "Universal Availability" mode but also for each different group selected in the "Custom Availability" mode, which will now be described.

In the "Custom Availability" mode, a "Default" availability status may be selected that serves as a general universal rule for which exceptions are designated for certain people or groups selected in any of several drop-down selection menus 1006 (e.g., a "Hierarchy" selection menu 1006-1, a "People" selection menu 1006-2, an "Other" selection menu 1006-3, or other selection menus not explicitly shown in FIG. 10). For example, the "Default" availability status may be set to the "Available" mode but then a particular coworker who sits nearby and tends to engage in many impromptu conversations may be designated to be presented with a "Busy" mode such that the user will not be distracted by the coworker's impromptu conversations. For each of the categories represented by selection menus 1006, FIG. 10 shows that more exceptions to the Default rule may be added ("Add . . . "). For example, if there are two different individual coworkers for which the user desires to make an exception to the general rule, another "People"-based rule may be added under the first one.

Selection menu 1006-1 may group individuals based on a hierarchy such as illustrated in FIG. 6A for organization 602. For example, based on where the user fits in the hierarchy, selection menu 1006-1 may automatically put other users into groups such as people who the user directly or indirectly reports to ("Supervisors"), people who directly or indirectly report to the user ("Subordinates"), and others with whom there is not a reporting relationship ("Peers"). By selecting one or more of these groups, Selection menu 1006-1 may allow the user to present different levels of availability to one group of people (e.g., his or her supervisors) and to another group of people (e.g., his or her peers and/or subordinates).

Selection menu 1006-2 may provide a list of specific individuals (e.g., "John", "Jane", "Amy", etc.) based on who sits in the vicinity of the user, based on who is in the user's department, or based on any other suitable criteria. By selecting one or more individuals from selection menu 1006-2, the user may direct system 100 to present different levels of availability to different people (as described above), as well as to allow or disallow different types of communication from these individuals in any way that the user chooses.

Selection menu 1006-3 may provide various other ways that people can be grouped that may serve a particular implementation. For example, as shown, groups of people may be distinguished by a virtual "Floor" that they sit on, by which "Department" they are in, by whether they are part of a "Custom Team" (e.g., a team configured by the user with individuals working on a particular project together), or by other suitable criteria. When the user selects one of the options of selection menu 1006-3, the arrows indicate that additional options may be presented to allow the user to select, for example, which floor, department, or custom team he or she would like to set a rule for. By selecting one or more groups from selection menu 1006-3, the user may direct system 100 to present different levels of availability to different people, as well as to allow or disallow different types of communication from these individuals in any way that the user chooses.

Each of selection menus 1006 are provided only by way of illustration and it will be understood that various other options may be included on these menus (e.g., if the user scrolls down) and/or other menus or options providing different ways of grouping people together for this purpose may be provided.

In various implementations, shared virtual spaces may be entirely virtual or may correspond to real-world, physical virtual spaces in any manner as may serve a particular implementation.

As one example, FIGS. 3 and 6B-9 described above illustrated examples of a shared virtual space implemented as a virtual office space associated with an organization employing a workforce of employees that includes a plurality of users. This shared virtual space (e.g., virtual office space 606) may be understood to not be based on any physical office space used by the organization, but, rather, to be entirely virtual (e.g., existing only in a virtual universe and not the physical world). In such an implementation, each of the users associated with profile icons 318 or 500 may be located at different locations remote from any physical office space used by the organization (e.g., if indeed the organization maintains physical office space and is not a virtual organization with no physical office space). For example, each user may be working from home or another suitable location as described above.

Figure 11:
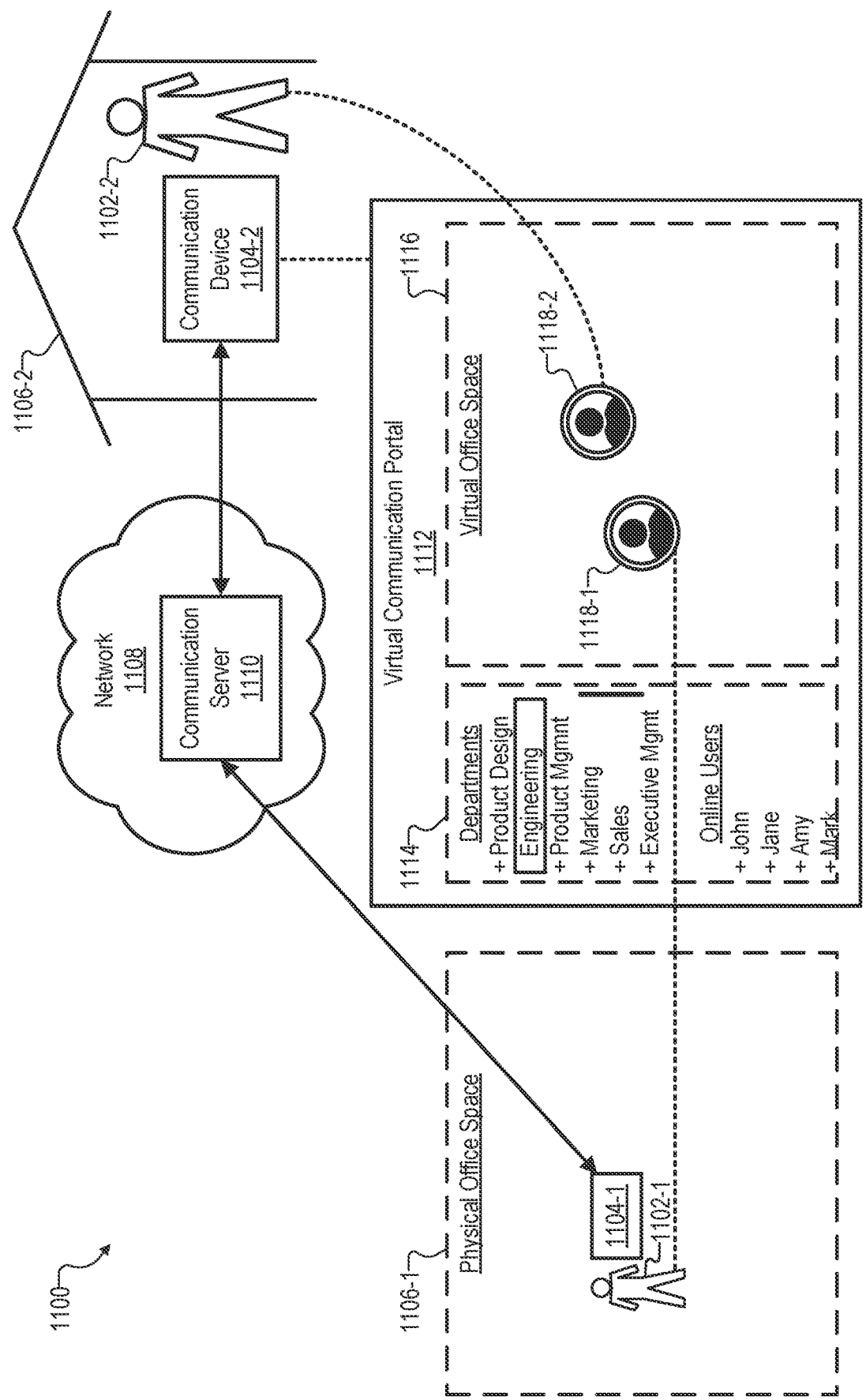
FIG. 11 shows another illustrative configuration in which the communication provider system of FIG. 1 may operate in accordance with principles described herein.

In contrast, as another example, FIG. 11 shows an illustrative configuration 1100 in which system 100 may operate and that illustrates an example of a different type of shared virtual space. Specifically, similar to configuration 300 of FIG. 3, configuration 1100 shows first and second users 1102 (i.e., first user 1102-1 and second user 1102-2) that use first and second communication devices 1104 (i.e., first communication device 1104-1 and second communication device 1104-2) from first and second sites 1106 (i.e., sites 1106-1 and 1106-2) to communicate by way of a network 1108 and, potentially, a communication server 1110. In this way, the users may login to use a virtual communication portal 1112 having a navigation panel 1114 and a virtual office space 1116 that includes profile icons 1118 for the users (i.e., profile icon 1118-1 representing user 1102-1 and profile icon 1118-2 representing user 1102-2).

All of these components may be understood to operate similarly to analogous components described above in relation to configuration 300. However, as shown, rather than site 1106-1 being a home of user 1102-1 (or other remote site from which user 1102-1 chooses to work), in configuration 1100, site 1106-1 where user 1102-1 is located is shown to be a physical office space. As such, the shared virtual space presented within virtual communication portal 1112 may be a virtual office space 1116 that is associated with an organization employing a workforce of employees that includes users 1102-1 and 1102-2, and virtual office space 1116 may be based on the physical office space used by the organization. As shown, user 1102-1 may be located at this physical office space used by the organization (i.e., site 1106-1) while user 1102-2 may be located at a physical location remote from the physical office space used by the organization.

By modeling virtual office space 1116 after the physical office space of site 1106-1, system 100 may present a hybrid of a real and a virtual office space to the employees of the organization. For example, user 1102-1 may physically be located in his or her workspace in the physical office and this may be reflected by the virtual location of profile icon 1118-1 within virtual office space 1116. Though user 1102-2 may not be physically located in his or her workspace proximate to that of user 1102-1 within the physical office space (e.g., because user 1102-2 is working remotely from site 1106-2), users 1102-1 and 1102-2 may communicate in similar ways as if they were both located in their respective workplaces within the physical office space.

A 2D or 3D model of the physical office space may be generated based on any blueprints, floor plans, 3D scans, or other information or technology as may serve a particular implementation. Based on such a model, system 100 may generate and present virtual office space 1116 to virtually replicate and/or have any suitable similarities (e.g., geometric, layout, décor, etc.) with physical office space 1106-1 as may serve a particular implementation. In certain examples, certain characteristics of virtual office space 1116 may replicate or be based on the physical office space of site 1106-1, while other characteristics may be customized and/or created to be only virtual with no real-world analog.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 12:
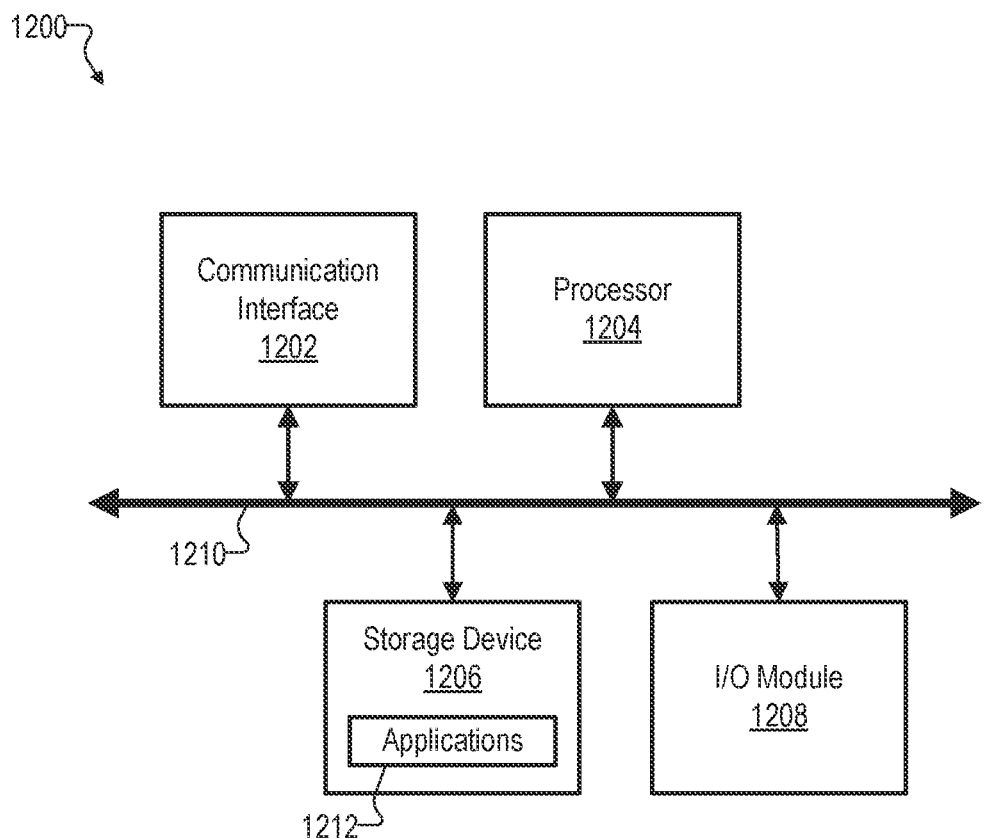
FIG. 12 shows an illustrative computing device that may implement communication provider systems and/or other systems and devices described herein in accordance with principles described herein.

FIG. 12 shows an illustrative computing device 1200 that may implement communication provider systems and/or other systems and devices described herein in accordance with principles described herein. For example, computing device 1200 may include or implement (or partially implement) a communication provider system such as system 100 or any component included therein or any system associated therewith (e.g., communication devices 304 or 1104, elements of networks 308 or 1108, communication servers 310 or 1110, etc.).

As shown in FIG. 12, computing device 1200 may include a communication interface 1202, a processor 1204, a storage device 1206, and an input/output (I/O) module 1208 communicatively connected via a communication infrastructure 1210. While an illustrative computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with processor 104 of system 100. Likewise, memory 102 of system 100 may be implemented by or within storage device 1206.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   determining, by a communication provider system, a virtual location status for a user, the virtual location status representative of a virtual location of the user within a shared virtual space the user shares with additional users that are organized into a hierarchical reporting structure that includes supervisors, peers, and subordinates of the user;
   determining, by the communication provider system, a first availability status and a second availability status for the user, wherein:
      the first availability status corresponds to an availability of the user with respect to a first hierarchical group of the additional users and is representative of a first availability mode of a plurality of selectable availability modes,
      the second availability status corresponds to an availability of the user with respect to a second hierarchical group of the additional users and is representative of a second availability mode of the plurality of selectable availability modes, the second availability mode different from the first availability mode, and
      the additional users are automatically put into the first and second hierarchical groups in accordance with the hierarchical reporting structure, such that each of the first and second hierarchical groups is a grouping made up of either the supervisors, the peers, or the subordinates of the user; and
   presenting, by the communication provider system, a representation of the shared virtual space to additional users of the first hierarchical group in a first communication interface and to additional users of the second hierarchical group in a second communication interface, the presenting including:
      displaying, based on the virtual location status, a first profile icon at a particular location in the shared virtual space represented within the first communication interface and a second profile icon at the particular location in the shared virtual space represented within the second communication interface, the particular location in the shared virtual space indicating the virtual location of the user within the shared virtual space,
      applying a first appearance attribute to the first profile icon to indicate the first availability status, and
      applying a second appearance attribute to the second profile icon to indicate the second availability status, the second appearance attribute different from the first appearance attribute.

2. The method of claim 1, wherein the first profile icon and the second profile icon each indicates an identity of the user, the identity indicated by an image representing the user included within the first and second profile icons.

3. The method of claim 2, wherein:
   the first appearance attribute includes a first color of a border that extends at least partially around the image representing the user in the first profile icon; and
   the second appearance attribute includes a second color of a border that extends at least partially around the image representing the user in the second profile icon, the second color different from the first color.

4. The method of claim 1, wherein the first availability mode represented by the first availability status indicates that the user:
   is available to engage in an impromptu communication with the additional users of the first hierarchical group, and
   is available to engage in a formally-initiated communication session with the additional users of the first hierarchical group.

5. The method of claim 1, wherein the first availability mode represented by the first availability status indicates that the user:
   is unavailable to engage in an impromptu communication with the additional users of the first hierarchical group, and
   is available to engage in a formally-initiated communication session with the additional users of the first hierarchical group.

6. The method of claim 1, wherein the first availability mode represented by the first availability status indicates that the user:
   is unavailable to engage in an impromptu communication with the additional users of the first hierarchical group, and
   is unavailable to engage in a formally-initiated communication session with the additional users of the first hierarchical group.

7. The method of claim 1, further comprising:
   detecting, by the communication provider system during the displaying of the first profile icon and the second profile icon, that the user logs out of a communication interface by way of which the representation of the shared virtual space is presented to the user; and
   ceasing displaying, by the communication provider system in response to the detecting that the user logs out, the first profile icon within the first communication interface and the second profile icon within the second communication interface.

8. The method of claim 1, further comprising:
   detecting, by the communication provider system during the displaying of the first profile icon, that the user commences a formally-initiated communication session with another user; and
   automatically updating, by the communication provider system in response to the detecting that the user commences the formally-initiated communication session, the first and second appearance attributes applied to the first and second profile icons to represent an updated availability status.

9. The method of claim 1, wherein:
   the shared virtual space is a virtual office space associated with an organization employing a workforce of employees that includes the user and the additional users;

the virtual office space is not based on any physical office space used by the organization;

the user is located at a first physical location remote from any physical office space used by the organization; and at least one of the additional users is located at a second physical location remote from the first physical location and from any physical office space used by the organization.

10. The method of claim 1, wherein:

the shared virtual space is a virtual office space associated with an organization employing a workforce of employees that includes the user and the additional users;

the virtual office space is based on a physical office space used by the organization;

the user is located at the physical office space used by the organization; and at least one of the additional users is located at a physical location remote from the physical office space used by the organization.

11. The method of claim 1, wherein the determining of the first availability status and the second availability status includes detecting user input provided by the user with respect to a graphical user interface configured to allow the user to input different availability statuses with respect to different users sharing the shared virtual space.

12. The method of claim 11, wherein the graphical user interface is configured to allow the user to input the different availability statuses with respect to where the different users sharing the shared virtual space fit in the hierarchical reporting structure.

13. A system comprising:

a memory storing instructions; and a processor communicatively coupled to the memory and configured to execute the instructions to:

determine a virtual location status for a user, the virtual location status representative of a virtual location of the user within a shared virtual space the user shares with additional users that are organized into a hierarchical reporting structure that includes supervisors, peers, and subordinates of the user;

determine a first availability status and a second availability status for the user, wherein:

the first availability status corresponds to an availability of the user with respect to a first hierarchical group of the additional users and is representative of a first availability mode of a plurality of selectable availability modes, the second availability status corresponds to an availability of the user with respect to a second hierarchical group of the additional users and is representative of a second availability mode of the plurality of selectable availability modes, the second availability mode different from the first availability mode, and the additional users are automatically put into the first and second hierarchical groups in accordance with the hierarchical reporting structure, such that each of the first and second hierarchical groups is a grouping made up of either the supervisors, the peers, or the subordinates of the user; and present a representation of the shared virtual space to additional users of the first hierarchical group in a first communication interface and to additional users of the second hierarchical group in a second communication interface, the presenting including:

displaying, based on the virtual location status, a first profile icon at a particular location in the shared virtual space represented within the first communication interface and a second profile icon at the particular location in the shared virtual space represented within the second communication interface, the particular location in the shared virtual space indicating the virtual location of the user within the shared virtual space, applying a first appearance attribute to the first profile icon to indicate the first availability status, and applying a second appearance attribute to the second profile icon to indicate the second availability status, the second appearance attribute different from the first appearance attribute.

14. The system of claim 13, wherein:

the first profile icon and the second profile icon each indicates an identity of the user, the identity indicated by an image representing the user included within the first and second profile icons;

the first profile icon indicates the first availability status of the user based on a first color of a border that extends at least partially around the image representing the user in the first profile icon; and the second profile icon indicates the second availability status of the user based on a second color of a border that extends at least partially around the image representing the user in the second profile icon, the second color different from the first color.

15. The system of claim 13, wherein the first availability mode represented by the first availability status indicates that the user:

is available to engage in an impromptu communication with the additional users of the first hierarchical group, and is available to engage in a formally-initiated communication session with the additional users of the first hierarchical group.

16. The system of claim 13, wherein the first availability mode represented by the first availability status indicates that the user:

is unavailable to engage in an impromptu communication with the additional users of the first hierarchical group, and is available to engage in a formally-initiated communication session with the additional users of the first hierarchical group.

17. The system of claim 13, wherein the first availability mode represented by the first availability status indicates that the user:

is unavailable to engage in an impromptu communication with the additional users of the first hierarchical group, and is unavailable to engage in a formally-initiated communication session with the additional users of the first hierarchical group.

18. The system of claim 13, wherein the processor is further configured to execute the instructions to:

detect, during the displaying of the first profile icon and the second profile icon, that the user logs out of a communication interface by way of which the representation of the shared virtual space is presented to the user; and cease displaying, in response to the detecting that the user logs out, the first profile icon within the first communication interface and the second profile icon within the second communication interface.

19. The system of claim 13, wherein the processor is further configured to execute the instructions to:
    detect, during the displaying of the first profile icon, that the user commences a formally-initiated communication session with another user; and
    automatically update, in response to the detecting that the user commences the formally-initiated communication session, the first and second appearance attributes applied to the first and second profile icons to represent an updated availability status.

20. A non-transitory computer-readable medium storing instructions that, when executed, direct a processor of a computing device to:
    determine a virtual location status for a user, the virtual location status representative of a virtual location of the user within a shared virtual space the user shares with additional users that are organized into a hierarchical reporting structure that includes supervisors, peers, and subordinates of the user;
    determine a first availability status and a second availability status for the user, wherein:
        the first availability status corresponds to an availability of the user with respect to a first hierarchical group of the additional users and is representative of a first availability mode of a plurality of selectable availability modes,
        the second availability status corresponds to an availability of the user with respect to a second hierarchical group of the additional users and is representative of a second availability mode of the plurality of selectable availability modes, the second availability mode different from the first availability mode, and
        the additional users are automatically put into the first and second hierarchical groups in accordance with the hierarchical reporting structure, such that each of the first and second hierarchical groups is a grouping made up of either the supervisors, the peers, or the subordinates of the user; and
    present a representation of the shared virtual space to additional users of the first hierarchical group in a first communication interface and to additional users of the second hierarchical group in a second communication interface, the presenting including:
        displaying, based on the virtual location status, a first profile icon at a particular location in the shared virtual space represented within the first communication interface and a second profile icon at the particular location in the shared virtual space represented within the second communication interface, the particular location in the shared virtual space indicating the virtual location of the user within the shared virtual space,
        applying a first appearance attribute to the first profile icon to indicate the first availability status, and
        applying a second appearance attribute to the second profile icon to indicate the second availability status, the second appearance attribute different from the first appearance attribute.

* * * * *